United States Patent
Jo et al.

(10) Patent No.: US 12,005,528 B2
(45) Date of Patent: Jun. 11, 2024

(54) WEAVING CONTROL METHOD AND WEAVING CONTROL SYSTEM

(71) Applicant: Kobe Steel, Ltd., Kobe (JP)

(72) Inventors: Baini Jo, Kobe (JP); Atsushi Fukunaga, Kobe (JP); Akira Ogawa, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 1015 days.

(21) Appl. No.: 16/959,590

(22) PCT Filed: Jan. 23, 2019

(86) PCT No.: PCT/JP2019/002134
§ 371 (c)(1),
(2) Date: Jul. 1, 2020

(87) PCT Pub. No.: WO2019/151088
PCT Pub. Date: Aug. 8, 2019

(65) Prior Publication Data
US 2020/0384563 A1 Dec. 10, 2020

(30) Foreign Application Priority Data
Jan. 30, 2018 (JP) .................. 2018-013930

(51) Int. Cl.
*B23K 9/022* (2006.01)
*B23K 9/12* (2006.01)
*B23K 37/02* (2006.01)

(52) U.S. Cl.
CPC ............. *B23K 9/022* (2013.01); *B23K 9/125* (2013.01); *B23K 37/0247* (2013.01); *B23K 37/0282* (2013.01); *B23K 37/0294* (2013.01)

(58) Field of Classification Search
None
See application file for complete search history.

(56) References Cited

U.S. PATENT DOCUMENTS 5,130,515 A * 7/1992 Toyoda ............... B23K 9/0216
901/42
2012/0305532 A1* 12/2012 Harris .................... B23K 9/095
219/76.14

FOREIGN PATENT DOCUMENTS

| CN | 107530810 A | 1/2018 |
|---|---|---|
| JP | 2014-111261 A | 6/2014 |

(Continued)

OTHER PUBLICATIONS

Machine translation of Japan Patent document No. 2014-111,261-A, Sep. 2023 (Year: 2023).*

(Continued)

*Primary Examiner* — Geoffrey S Evans
(74) *Attorney, Agent, or Firm* — Oblon, McClelland, Maier & Neustadt, L.L.P.

(57) ABSTRACT

A weaving control method in fillet welding. On a surface perpendicular to a welding direction, a position of the welding torch is set such that a weaving reference line passes through a base point on a weld line, and at least five fixed end points are set, and positions of the fixed end points are set such that one or more of the fixed end points are provided on each of both sides across the weaving reference line and a reference end point a being on the weaving reference line and having the shortest distance between a tip and a base metal is provided. The weaving operation is performed such that the welding torch moves between the fixed end points along with a trajectory forming a polygon when viewed from the welding direction.

15 Claims, 16 Drawing Sheets

(56) References Cited

FOREIGN PATENT DOCUMENTS

| | | | |
|---|---|---|---|
| JP | 2014111261 A | * | 6/2014 |
| JP | 2014-176878 A | | 9/2014 |
| JP | 2015-205280 A | | 11/2015 |

OTHER PUBLICATIONS

International Search Report dated Mar. 26, 2019 in PCT/JP2019/002134 filed Jan. 23, 2019 (with English language translation), 4 pages.
Written Opinion dated Mar. 26, 2019 in PCT/JP2019/002134 filed Jan. 23, 2019 (with English language translation), 13 pages.

* cited by examiner

Pattern A (Example)

Pattern B (Example)

Pattern C (Example)

Pattern D (Example)

Pattern E (Example)

Pattern F (Comparative Example)

Pattern G (Comparative Example)

Pattern H (Comparative Example: Related Art)

WEAVING CONTROL METHOD AND WEAVING CONTROL SYSTEM

TECHNICAL FIELD

The present invention relates to a weaving control method and weaving control system of a welding robot used for fillet welding.

BACKGROUND ART

In manufacture of a welded structure in shipbuilding, a steel frame, a bridge, and the like, there are many places where fillet welding is applied as a construction method. Gas shielded arc welding is generally applied as the fillet welding, and a good bead appearance, good weldability, a large leg length, and prevention of weld defects are required in the related art. In particular, the larger leg length is required as a plate thickness of a material to be welded becomes larger, but the leg length obtained by one-pass welding is limited in view of the bead appearance, good weldability, and prevention of weld defects. Therefore, the leg length must be ensured by two-pass welding, and there is a problem that efficiency is poor.

With respect to a problem associated with the leg length, as a method for obtaining a large leg length by one-pass welding, Patent Literature 1 discloses a technique in which a torch angle of an electrode is 20° to 40° from a lower plate side, a target position of welding is set at 0 to 5 mm away from an intersection of an upright plate and a lower plate to the lower plate side, and a flux-cored wire, which contains, in mass % based on a total wire mass, C: 0.02% to 0.08%, Si: 0.2% to 1.0%, Mn: 1.0% to 4.0%, a Ti oxide in a $TiO_2$ converted value: 3.0% to 6.0%, a Si oxide in a $SiO_2$ conversion value: 1.0% to 4.0%, a Fe oxide in a FeO conversion value: 0.1% to 1.0%, a sum of a Zr oxide and Zr in a $ZrO_2$ conversion value: 0.2% to 1.5%, a sum of Mg in a MgO conversion value and MgO: 1.0% to 3.5%, a sum of Al in an $Al_2O_3$ conversion value and $Al_2O_3$: 0.05% to 0.70%, a fluorine compound in a F conversion value: 0.03% to 0.30%, a sum of a Na compound in a $Na_2O$ conversion value and a K compound in a $K_2O$ conversion value: 0.05% to 0.3%, and a sum of slag forming agents: 6.0% to 13.0%, is used, and then, a large leg length of 10 mm or more is obtained by one-pass welding and a high-quality welded portion with a good bead appearance and without surface defects such as undercut and overlap, and as a result, welding efficiency can be improved without a need of performing two-pass welding or a need of adjustment.

Further, Patent Literature 2 discloses a technique in which a solid wire for welding is used for a leading electrode and a flux-cored wire for welding is used for a trailing electrode, an electrode distance between the leading electrode and the trailing electrode is 50 mm or more, each of torch angles of the leading electrode and the trailing electrode with respect to a lower plate is 40° to 60°, a wire target position of the leading electrode is 5 mm to 10 mm away from a root portion to the lower plate side, a wire target position of the trailing electrode is 3 mm to 7 mm away from the root portion to an upper plate side, and each of wire diameters of the leading electrode and the trailing electrode is 1.2 mm to 2.0 mm, so that in horizontal fillet gas shielded arc welding for a thick plate, arc state is stable and spatter generation is small, and a fillet welded portion having uniform large leg lengths with good slag encapsulation, good slag removability, a good bead shape, and no weld defect can be obtained efficiently, and porosity resistance is excellent even in welding for a primer coating steel plate.

CITATION LIST

Patent Literature

Patent Literature 1: JP 2014-176878 A
Patent Literature 2: JP 2015-205280 A

SUMMARY OF INVENTION

Technical Problem

However, in Patent Literature 1, although a large leg length of 10 mm or more is obtained by one-pass welding, there is no description about penetration of the root portion, and a slag-based flux-cored wire by which stable penetration is difficult to be obtained is used, so that lack of penetration of the root portion and slag entrainment in the vicinity of the root portion easily occur.

In Patent Literature 2, insufficient penetration of the root portion can be solved by using two electrodes and performing two-pass welding once, but there is a place to which welding cannot be applied in view of automation of welding work. For example, in a corner portion, there are cases where a trailing electrode cannot follow a leading electrode successfully, and occurrence of weld defects or deterioration of weldability are predicted. Therefore, in order to further improve the efficiency by automation, it is good to use a single electrode.

Further, in both Patent Literature 1 and Patent Literature 2, horizontal fillet welding is considered, but these techniques cannot be applied to various postures such as downward fillet welding and vertical fillet welding.

Therefore, an object of the present invention is to provide a technique in which a single electrode that is easy to be applied to automation is used, efficiency is maintained by performing one-pass welding for a long leg length required for fillet welding, a good bead appearance and good weldability are obtained, and weld defects such as lack of penetration, undercut, and overlap are prevented.

Solution to Problem

Under such an object, the weaving control method in the present invention is a weaving control method for performing welding along a predetermined weld line while swinging a welding torch by a weaving operation in fillet welding of two materials to be welded, wherein:
  when the weaving operation is performed,
  on a surface perpendicular to a welding direction,
  a position of the welding torch is set such that a weaving reference line which is a center line at an initial position of the weaving operation passes through a base point on a weld line, and at least five fixed end points are set,
  positions of the fixed end points are set such that one or more of the fixed end points are provided on each of both sides across the weaving reference line and a reference end point a being on the weaving reference line and having the shortest distance between a tip and a base metal is provided; and
  the weaving operation is performed such that the welding torch moves between the fixed end points along with a trajectory forming a polygon when viewed from the welding direction.

In a preferred embodiment of the present invention, the number of the fixed end points provided on each of both sides across the weaving reference is the same.

In a preferred embodiment of the present invention, the total number of the fixed end points is 5; and
when two of the fixed end points provided in the vicinity of the one weaving end are defined as a weaving end point b and a weaving end point c and two of the fixed end points provided in the vicinity of the other weaving end are defined as a weaving end point d and a weaving end point e,
the welding torch repeats an operation of starting from the reference end point a and moving in order of the weaving end point b, the weaving end point c, the weaving end point d, and the weaving end point e.

In a preferred embodiment of the present invention, the distances between the tip and the base metal at the reference end point a and the weaving end points b to e satisfy the following conditions respectively with respect to a distance between the tip and the base metal set in advance:
reference end point a: 20% to 45%;
weaving end point b: 50% to 80%;
weaving end point c: 100% to 120%;
weaving end point d: 100% to 120%; and
weaving end point e: 80% to 100%.

In a preferred embodiment of the present invention,
a moving speed from the reference end point a to the weaving end point b is 250 cm/min to 450 cm/min;
a moving speed from the weaving end point b to the weaving end point c is 300 cm/min to 500 cm/min;
a moving speed from the weaving end point c to the weaving end point d is 250 cm/min to 450 cm/min;
a moving speed from the weaving end point d to the weaving end point e is 350 cm/min to 550 cm/min;
a moving speed from the weaving end point e to the reference end point a is 150 cm/min to 350 cm/min; and
a stop time of 200 ms or less is provided at each of the fixed end points.

In a preferred embodiment of the present invention, at least one of conditions of a welding current, an arc voltage, and a feeding speed is changed at the fixed end points.

In a preferred embodiment of the present invention,
when the condition of the welding current is changed,
ratios (percentages) of welding current values at the reference end point a and the weaving end points b to e to a set current value satisfy the following conditions respectively:
reference end point a: 105% to 110%;
weaving end point b: 90% to 100%;
weaving end point c: 80% to 90%;
weaving end point d: 80% to 90%; and
weaving end point e: 90% to 100%.

In a preferred embodiment of the present invention,
when the condition of the arc voltage is changed,
ratios (percentages) of arc voltage values at the reference end point a and the weaving end points b to e to a set voltage value satisfy the following conditions respectively:
reference end point a: 105% to 110%;
weaving end point b: 80% to 90%;
weaving end point c: 110% to 120%;
weaving end point d: 110% to 120%; and
weaving end point e: 80% to 90%.

In a preferred embodiment of the present invention,
when the condition of the feeding speed is changed,
ratios (percentages) of feeding speed values at the reference end point a and the weaving end points b to e to a set feeding speed value satisfy the following conditions respectively:
reference end point a: 105% to 110%;
weaving end point b: 90% to 100%;
weaving end point c: 80% to 90%;
weaving end point d: 80% to 90%; and
weaving end point e: 90% to 100%.

In a preferred embodiment of the present invention, the weaving control method is a weaving control method in horizontal fillet welding in which one of the two materials to be welded is an upright plate and the other is a lower plate,
wherein the weaving end point b and the weaving end point c are provided on the upright plate side, and the weaving end point d and the weaving end point e are provided on the lower plate side.

In a preferred embodiment of the present invention, interior angles at the weaving end points b to e in a pentagon formed by the reference end point a, the weaving end point b, the weaving end point c, the weaving end point d, and the weaving end point e satisfy the following conditions respectively:
weaving end point b: 130° to 140°;
weaving end point c: 60° to 90°;
weaving end point d: 60° to 90°; and
weaving end point e: 130° to 140°.

In a preferred embodiment of the present invention,
a trajectory of the welding torch in welding by weaving is a trajectory in which the welding torch is moved forward in the welding direction to the one weaving end, and when the welding torch reaches the one weaving end, the welding torch is moved backward in the welding direction to the other weaving end, and this weaving operation is repeated between the two materials to be welded;
when the welding torch is moved forward in the welding direction to the one weaving end, a forward movement angle $\beta$, which is an angle formed between the trajectory of the welding torch and a direction opposite to the welding direction, is 185° or more and 250° or less;
when the welding torch is moved backward in the welding direction to the other weaving end, a backward movement angle $\alpha$, which is an angle formed between the trajectory of the welding torch and a direction opposite to the welding direction, is 5° or more and 85° or less; and
the backward movement angle $\alpha$ and the forward movement angle $\beta$ satisfy the following relationship: $\alpha > (\beta - 180)$.

The weaving control system in the present invention is a weaving control system for performing welding along a predetermined weld line while swinging a welding torch by a weaving operation in fillet welding of two materials to be welded, wherein:
when the weaving operation is performed,
on a surface perpendicular to a welding direction,
a position of the welding torch is set such that a weaving reference line which is a center line at an initial position of the weaving operation passes through a base point on a weld line, and at least five fixed end points are set,
positions of the fixed end points are set such that one or more of the fixed end points are provided on each of both sides across the weaving reference line and a reference end point a being on the weaving reference line and having the shortest distance between a tip and a base metal is provided; and the weaving operation is performed such that the welding torch moves between the fixed end points along with a trajectory forming a polygon when viewed from the welding direction.

Advantageous Effects of Invention

In the present invention, by applying special weaving control in fillet welding, it is possible to obtain a good bead appearance and good weldability and prevent weld defects such as lack of penetration, undercut, and overlap while maintaining efficiency by using a single electrode and one-pass welding. Accordingly, automation of welding work can be easily applied.

DESCRIPTION OF EMBODIMENTS

Embodiments in the present invention (the present embodiment) are described below. The present embodiments are examples of the cases where a welding robot is used, and weaving control in the present invention is not limited to configurations in the present embodiment. For example, the weaving control in the present invention may be mounted on an automatic apparatus using a truck.

<System Configuration>

Figure 1:
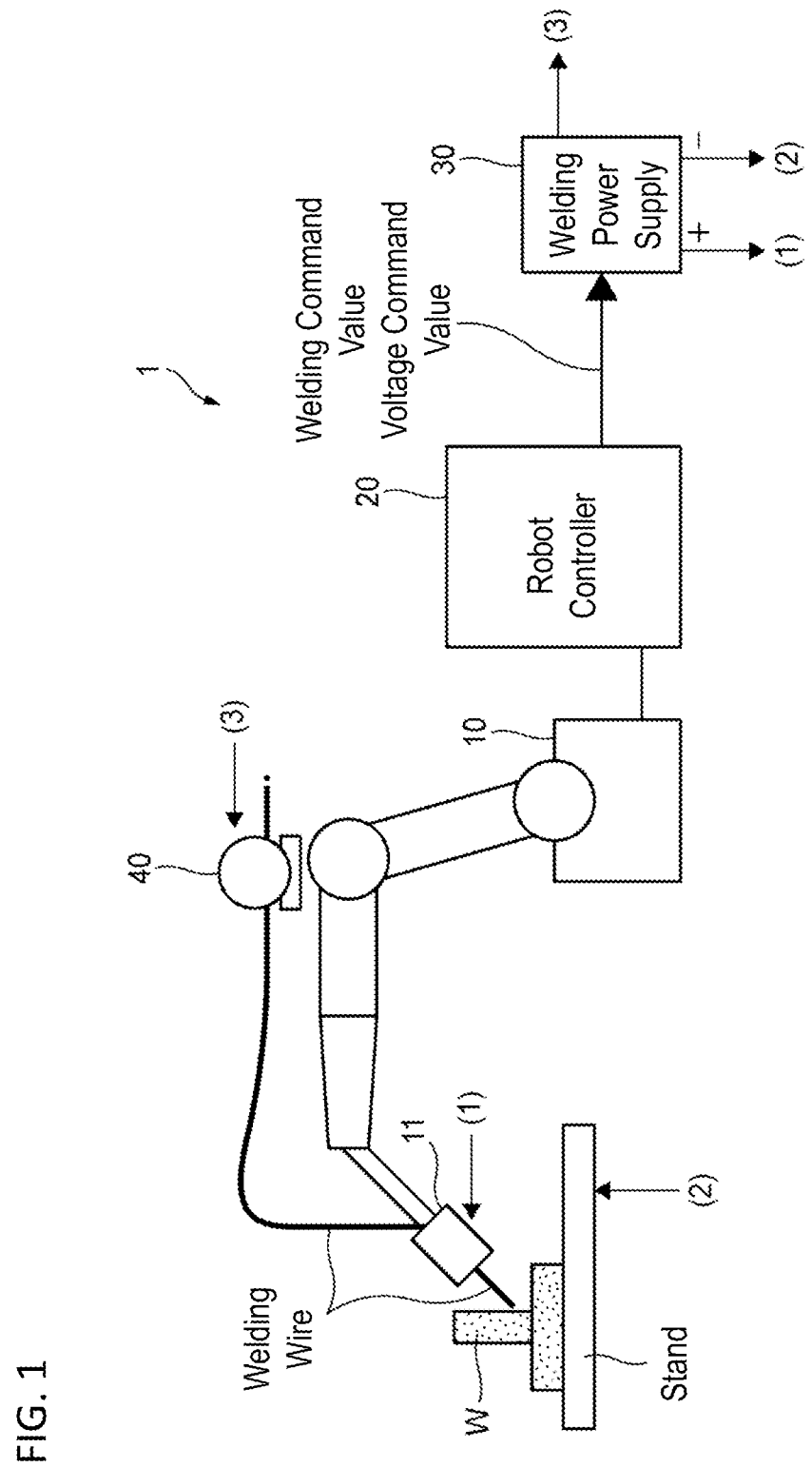
FIG. 1 is a diagram showing an example of a schematic configuration of a welding system in the present embodiment.

FIG. 1 is a diagram showing an example of a schematic configuration of a welding system in the present embodiment. As shown in FIG. 1, the welding system 1 includes a welding robot 10, a robot controller 20, a welding power source 30, and a feeding device 40. The welding power source 30 is connected to a welding torch side (electrode side) via a plus power cable (1), and is connected to a workpiece W via a minus power cable (2). This is the case where welding is performed with reverse polarity, and in the case where welding is performed with positive polarity, the following conditions are only required: the welding power source 30 is connected to the workpiece W side via the plus power cable (1) and is connected to the welding torch side via the minus power cable (2). Further, a power cable (3) in the figure connects the welding power source 30 and the feeding device 40 for a welding wire, and controls feeding speed of the welding wire.

Then, the welding system 1 performs fillet welding along a weld line which is any position on the periphery of a butted portion (hereinafter, referred to as a "root portion") of two materials to be welded. The periphery of the root portion is, for example, within a range of 30 mm from the root portion to both sides. In the present embodiment, the welding robot 10 is used as an example of a fillet welding device. Further, as an example of a control device, the robot controller 20 is used, and any instructions can be sent to the robot controller 20 by a teaching device that is not shown.

The welding robot 10 includes a welding torch 11 as an end effector, and the welding torch 11 has an energization mechanism (contact tip) for energizing a consumable electrode (hereinafter, referred to as a "welding wire"). By energizing the welding wire from the contact tip, an arc is generated from a tip of the welding wire, and the workpiece W to be welded is welded by the heat. Further, the welding robot 10 performs welding along the weld line (along a welding direction) by weaving the welding torch 11 (specifically, the welding wire tip) based on the weld line taught in advance.

In general welding, welding is performed while maintaining a distance from the energization point between the contact tip and the welding wire to a base metal. A name related to the distance is generally called a "distance between the tip and the base metal" (since the energization point is a tip of the contact tip) or an "electrode extension". In the case where the distance between the tip and the base metal is shorter than an appropriate value, a welding current increases, and in the case where weaving welding is performed, a weld defect such as undercut may occur at a weaving end. On the other hand, in the case where the distance between the tip and the base metal is longer than the appropriate value, it is highly possible that penetration on the weld line is not sufficiently obtained or a weld defect occurs due to deterioration of shielding properties. The specific optimum value of the distance between the tip and the base metal varies depending on a wire diameter and composition of the welding wire, but in the case where the wire diameter is within a range of 0.9 mm to 1.6 mm, the distance between the tip and the base metal is preferably within a range of 10 mm to 40 mm.

Further, the welding torch 11 includes a shielding gas nozzle (a mechanism for ejecting shielding gas). As the shielding gas, for example, 100% $CO_2$, 100% Ar, or a mixture of $CO_2$ with Ar may be used. In the case of desiring to give priority to the penetration effect, it is preferable to use 100% $CO_2$. On the other hand, in the case of prioritizing to the weldability, it is preferable to use 100% Ar or a mixed gas of $CO_2$ with Ar. From the viewpoint of preventing lack of shielding gas, the upper limit of a gas flow rate is preferably 40 L/min, and the lower limit thereof is preferably 15 L/min.

The robot controller (robot control panel) 20 controls operation of the welding robot 10. Here, the robot controller 20 holds teaching data defining an operation pattern of the welding robot 10, a welding start position, a welding end position, welding conditions, a weaving operation and the like in advance, and instructs these to the welding robot 10 to control the operation of the welding robot 10. During the welding work, the robot controller 20 instructs the welding power source 30 to control the power source based on the teaching data.

The welding power source 30 supplies electric power to the welding wire and the workpiece W based on the instructions from the robot controller 20 to generate an arc between the welding wire and the workpiece W. The welding power source 30 supplies electric power to the feeding device 40 based on the instructions from the robot controller 20. A current during the welding work may be a direct current or an alternating current, and a waveform thereof is not particularly limited. Therefore, the waveform may be a pulse such as a rectangular wave or a triangular wave.

The feeding device 40 sends the welding wire to the welding torch 11 depending on proceeding of the welding work. The welding wire sent by the feeding device 40 is not particularly limited, but is selected depending on a nature of the workpiece W or a welding mode, and for example, a solid wire or a flux-cored wire is used. A material of the welding wire is not limited, and may be, for example, mild steel or a material such as stainless steel, aluminum, or titanium. Further, although the diameter of the welding wire is not particularly limited, the upper limit is preferably 1.6 mm and the lower limit is preferably 0.9 mm in the present embodiment.

<Weaving Operation>

Figure 2:
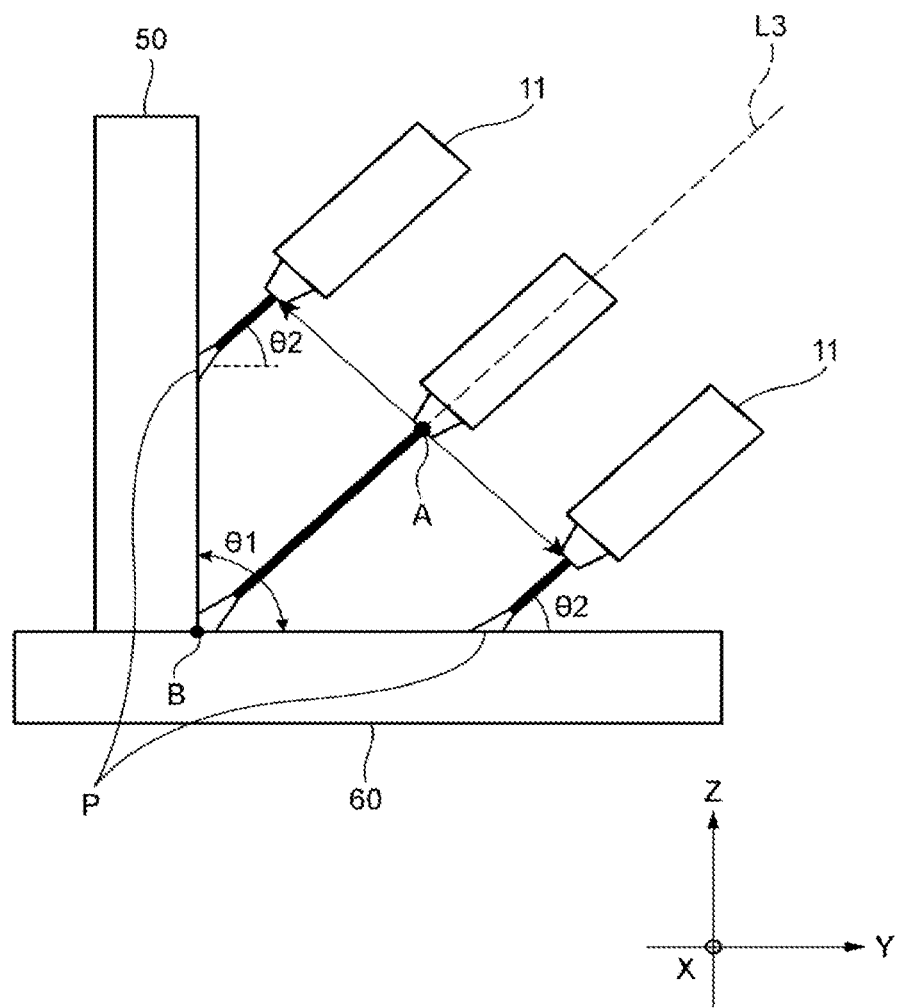
FIG. 2 is a schematic view of horizontal fillet welding in the related art, viewed from a welding direction.

FIG. 2 is a schematic view of horizontal fillet welding in the related art, viewed from a welding direction. The horizontal fillet welding in the schematic diagram is an example, and the present invention can be applied to fillet welding, i.e. both downward fillet welding and vertical fillet welding. As shown in the figure, a lower plate 60 is arranged horizontally, and an end face of an upright plate 50 is arranged on an upper surface thereof, and a root portion B where the upright plate 50 and the lower plate 60 are butted (a joint angle $\theta_1$ at the root portion=90 degrees in the case of FIG. 2) is set as a welding target position (a base point on the weld line), and then, fillet welding is performed. Here, welding proceeds in a direction perpendicular to a paper surface, and the weld line set in FIG. 2 is a line connecting a welding start point to a welding end point in the root portion (a position of B).

A weaving operation in the related art is performed in a direction perpendicular to a weaving reference line L3, which is a center line at an initial position of the weaving operation, namely a direction indicated by the arrow in FIG. 2, and the weaving operation is performed alternately in a direction toward the lower plate 60 and a direction toward the upright plate 50. Here, more specifically, the weaving reference line L3 is shown by a line connecting the base point on the weld line (point B in FIG. 2) and a tip position of the contact tip of the welding torch 11 (point A in FIG. 2), and passes through the center of the welding torch 11 at the initial position of the weaving operation.

In FIG. 2, a line connecting the tip position A of the contact tip of the welding torch 11 and the root portion B which is a welding target position is a line passing through the center of the welding torch 11 at the initial position of the weaving operation, namely the weaving reference line L3. In this figure, a direction perpendicular to an angle $\theta_2$ (wire tip angle or torch angle) formed between the lower plate 60 and the welding wire tip of the welding torch 11 is a direction indicated by the arrow in FIG. 2, and the weaving operation is performed along the direction.

Next, a weaving operation to be controlled in the present embodiment is described. Although the weaving operation in the related art is performed by swinging as described above, in the present embodiment, when the weaving operation is performed, on the surface perpendicular to the welding direction X, a position of the welding torch is set such that the weaving reference line which is the center line at the initial position of the weaving operation passes through the base point on the weld line, at least five fixed end points (teaching points) are set, and the welding torch 11 moves between the fixed end points along with a trajectory forming a polygon when viewed from the welding direction X. The positions of the fixed end points are set such that one or more of the fixed end points are provided on each of both sides across the weaving reference line and a reference end point a being on the weaving reference line and having the shortest distance between the tip and the base metal is provided. In the present embodiment, since a feeding position to the welding wire is the tip of the contact tip, each fixed end point refers to the position of the tip of the contact tip.

Figure 3:
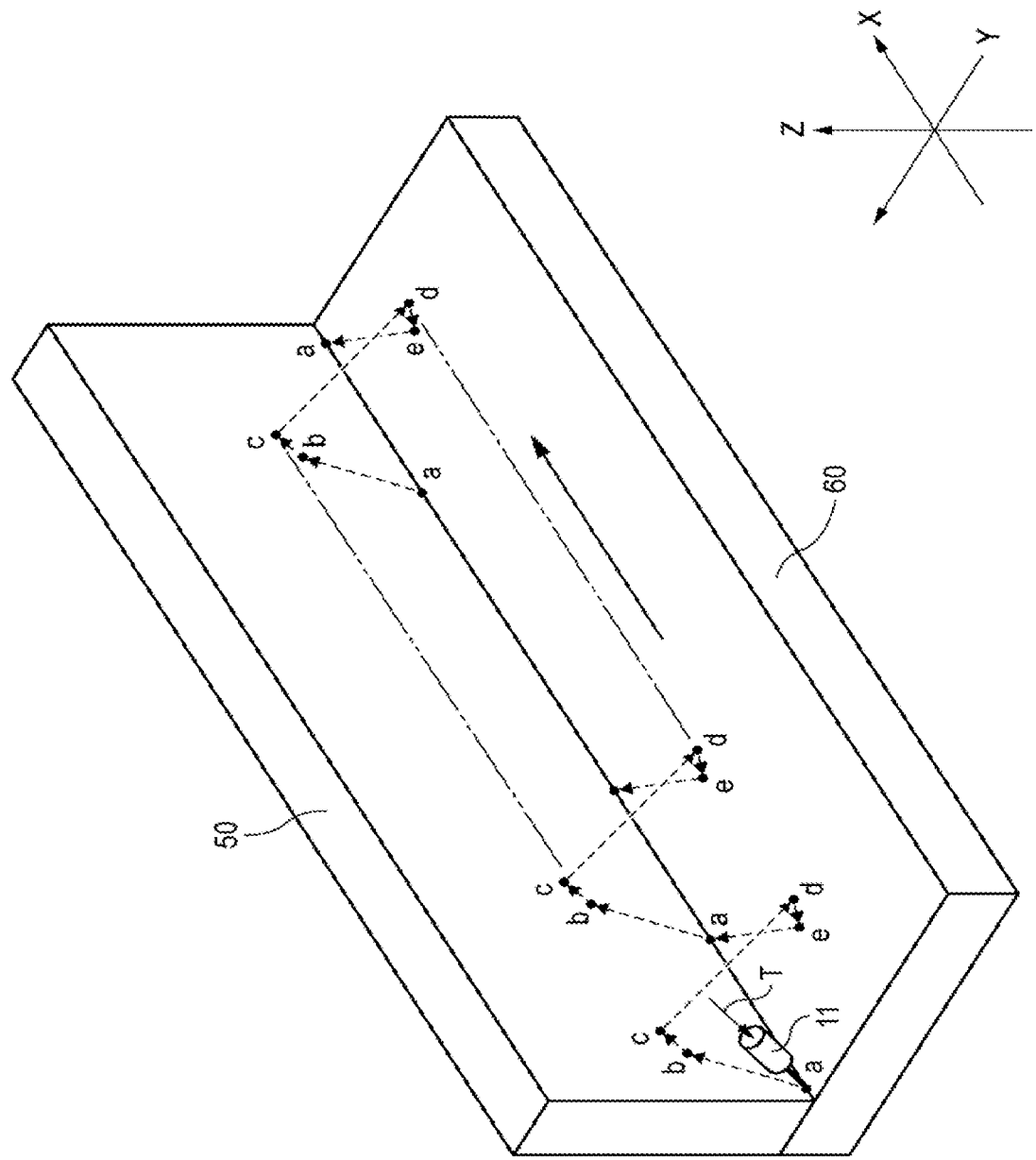
FIG. 3 is a perspective view for illustrating a weaving operation in horizontal fillet welding in the present embodiment.
Figure 4:
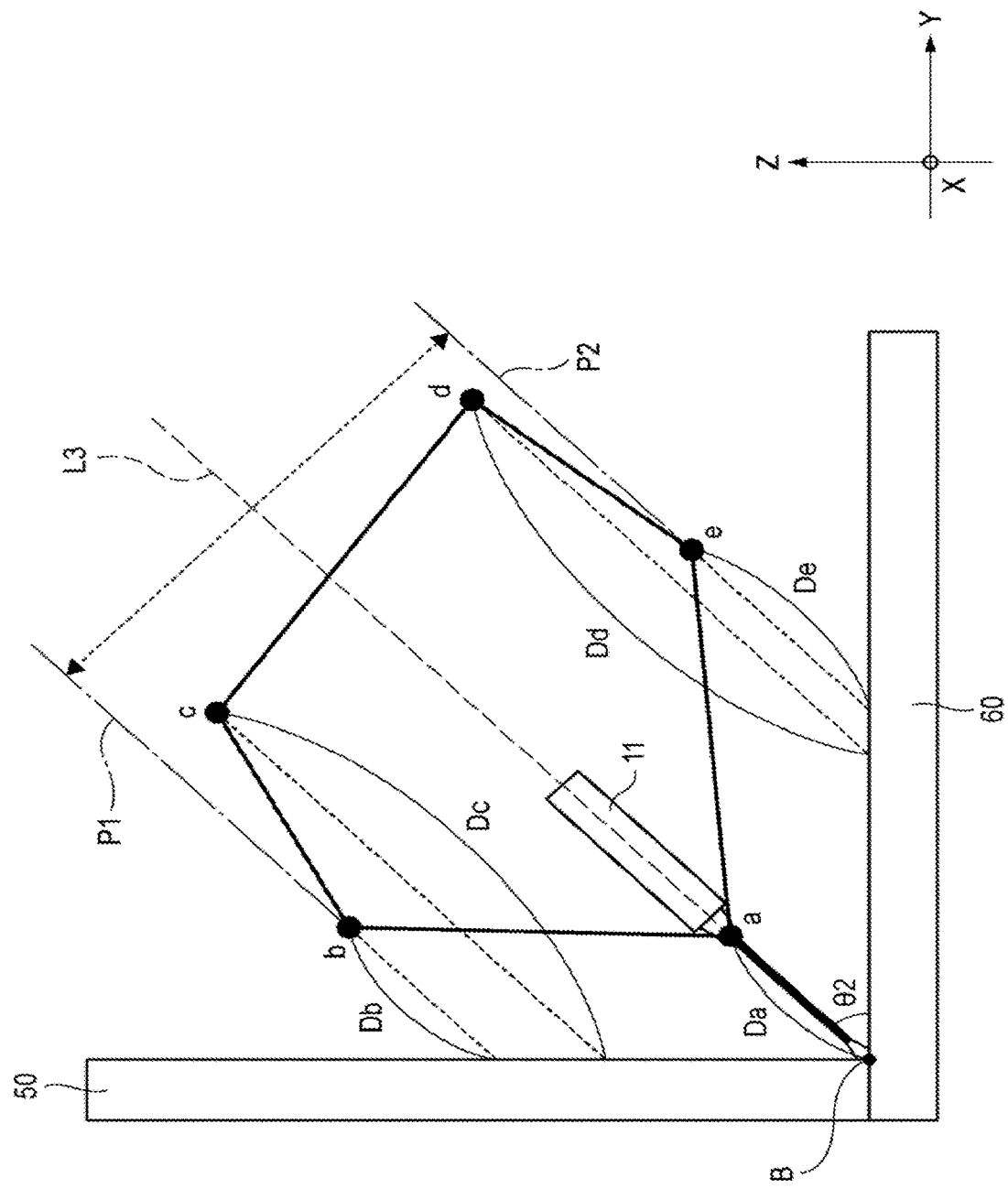
FIG. 4 is a schematic view for illustrating the weaving operation in horizontal fillet welding in the present embodiment, viewed from a welding direction.

FIG. 3 is a perspective view for illustrating a weaving operation in horizontal fillet welding in the present embodiment. Further, FIG. 4 is a schematic view for illustrating the weaving operation in horizontal fillet welding in the present embodiment, viewed from the welding direction X. As shown in FIG. 4, in the present embodiment, the position of the welding torch 11 is set based on an upright plate side weaving end P1 and a lower plate side weaving end P2, and such that the weaving reference line which is the center line of the welding torch 11 at the initial position of the weaving operation passes through a base point on the weld line (a point B which is a root portion in FIG. 4), and five fixed end points (teaching points) are provided. The positions of the five fixed end points are set such that one or more of the five fixed end points are provided on each of both sides across the weaving reference line L3 (weaving end points b to e) and the reference end point a being on the weaving reference line L3 and having the shortest distance between the tip and the base metal is provided. That is, in FIG. 4, the distance $D_a$ between the tip and the base metal at the reference end point a is set shorter than any of the distances $D_a$ to $D_e$ between the tip and the base metal at the weaving end points b to e. The reference end point a is set such that the distance $D_a$ between the tip and the base metal is the shortest.

Here, in order to obtain a good bead appearance and prevent weld defects such as undercut and overlap, it is necessary to provide at least five fixed end points. However, from the viewpoint of ensuring better weldability and accuracy of control, the total number of the fixed end points is preferably five as in the present embodiment. For example, in the case where the total number of the fixed end points is seven, in a processing capacity of the system in the present embodiment, since spatter generation may increase and weldability may be poor due to processing delay, the total number is preferably set to a total number corresponding to the processing capacity.

Here, in order to obtain a good bead appearance, the number of the fixed end points provided on each of both sides (the upright plate 50 side and the lower plate 60 side) across the weaving reference line L3, when viewed from the welding direction X, is preferably the same.

In the present embodiment, as shown in FIG. 4, the reference end point a is provided on the weaving reference line L3, and two fixed end points are provided on the upright plate 50 side and two fixed end points are provided on the lower plate 60 side. The fixed end points are located in the vicinity of a weaving end, the weaving end point b and the weaving end point c are provided in the vicinity of the weaving end P1 on the upright plate side, and the weaving end point d and the weaving end point e are provided in the vicinity of the weaving end P2 on the lower plate side. In the present embodiment, "the vicinity of the weaving end" is a range having a distance of ¼ of a weaving width from the weaving end (P1 or P2 in FIG. 4) to each of both ends in a direction parallel with a swinging direction of weaving. For example, in the case where the weaving width is set to 6 mm, "the vicinity of the weaving end" means a range of 1.5 mm from the weaving end to each of both ends in the direction parallel with the swinging direction of weaving.

In the weaving operation in the present embodiment, a series of operation of moving from the reference end point a as a starting point to the weaving end point b, moving from the weaving end point b to the weaving end point c, moving from the weaving end point c to the weaving end point d, moving from the weaving end point d to the weaving end point e, and moving from the weaving end point e back to the reference end point a is regarded as one cycle of the weaving operation, and a trajectory thereof draws a pentagon as shown in FIG. 4. The welding torch 11 moves in the welding direction X while performing the weaving operation as described above, and thus, as shown in FIG. 3, the welding torch 11 moves spirally while drawing the trajectory of a pentagon shape.

With regard to the direction of drawing the trajectory, the weaving operation may be performed such that a trajectory of a pentagon shape is drawn in a direction of moving from the reference end point a as a starting point to the weaving end point e, moving from the weaving end point e to the weaving end point d, moving from the weaving end point d to the weaving end point c, moving from the weaving end point c to the weaving end point b, and moving from the weaving end point b to the reference end point a, but in the horizontal fillet welding as in the present embodiment, it is preferable to move in a direction of advancing from the reference end point a toward the upright plate 50 (namely a direction of advancing toward the weaving end b in FIG. 4).

By moving in the direction, dripping of the weld metal can be prevented, and an effect of improving the bead shape with an equal leg length is easily obtained. In the downward fillet welding, even in any of the above directions, an effect of improving the bead shape with the equal leg length is easily obtained.

<Distance Between Tip and Base Metal During Weaving Operation>

As described above, the reference end point a is set such that the distance between the tip and the base metal is shorter than those at the other fixed end points. By shortening the distance $D_a$ between the tip and the base metal at the reference end point a, it is possible to increase arc force on the weaving reference line L3 (in the vicinity of the root portion), and to obtain a sufficient penetration amount even in the one-pass welding with the use of the single electrode. However, in the case where the distance between the tip and the base metal is shortened in the weaving reference line L3, sufficient penetration can be obtained, but in the case where the distance between the tip and the base metal is shortened in the whole of the weaving reference line L3, a good bead shape cannot be obtained.

Therefore, during the weaving operation, the number of times of passing through the weaving reference line L3 as a point where the distance between the tip and the base metal is shortened in the weaving reference line L3 is set as a ratio of one time to two times in one cycle of the weaving operation. This leads to dispersion of the arc force applied to the weaving reference line L3, and thus, the bead appearance and the equal leg length can be maintained while maintaining the penetration.

For example, in the case of horizontal fillet welding in the present embodiment, as shown in FIG. 4, the reference end point a where the distance between the tip and the base metal is shortened is set as a starting point (a distance $D_a$ between the tip and the base metal), and the torch moves to the weaving end point b and the weaving end point c on the upright plate 50 side (distances $D_b$ and $D_c$ between the tip and the base metal) while increasing the distance between the tip and the base metal. When the torch moves from the weaving end point c to the weaving end point d, although the torch passes through the weaving reference line L3, the distance between the tip and the base metal remains long (the distance $D_a$ between the tip and the base metal). This is for preventing deterioration of bead shape or poor equal leg length, caused by pressing down molten metal on the upright plate 50 side to the lower plate 60 side by arc force.

Figure 5:
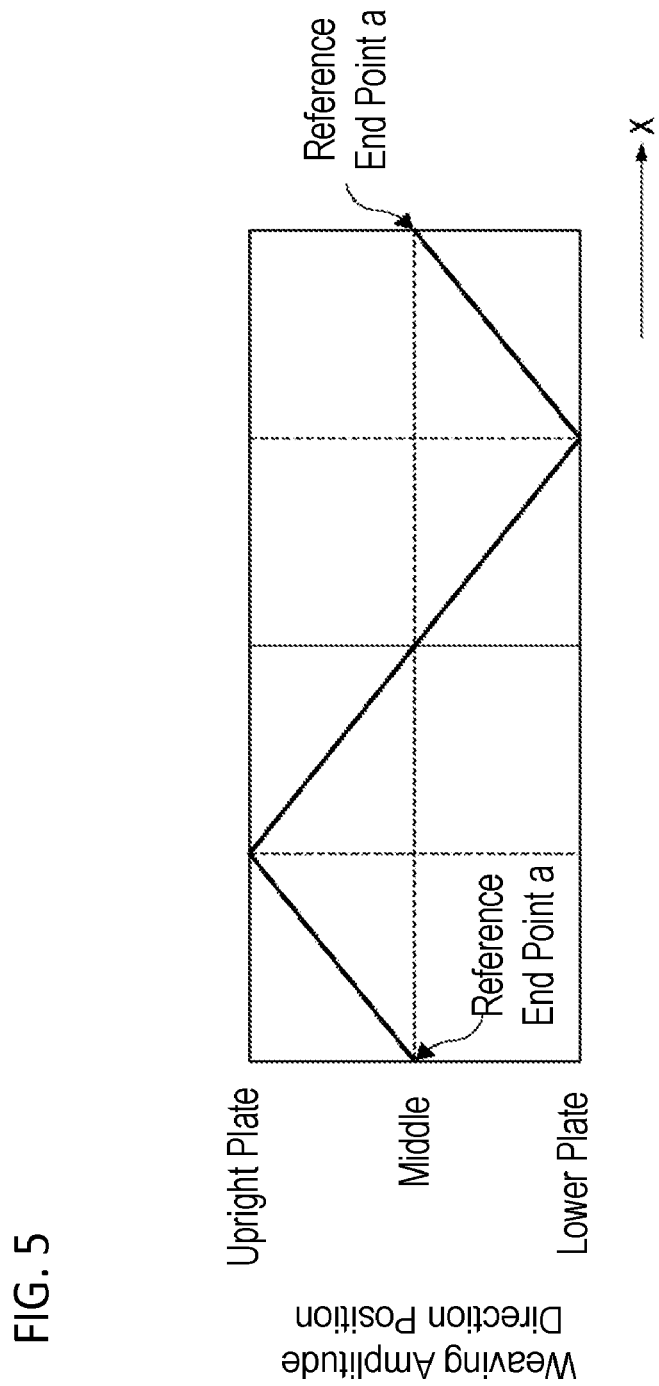
FIG. 5 is a diagram for illustrating an example of an amplitude of a welding torch in weaving.

When the torch moves from the weaving end point d to the weaving end point e, the distance between the tip and the base metal is gradually shortened (the distance $D_e$ between the tip and the base metal), and in order to ensure penetration, the torch returns to the reference end point a where the distance between the tip and the base metal is the shortest. FIG. 5 shows an amplitude of the welding torch in the weaving operation in the present embodiment, when viewed from a direction T in FIG. 3. From FIG. 5, it is understood that the number of times of passing through a middle position in a weaving amplitude direction, which is the weaving reference line L3, is a ratio of one time to two times in one cycle of the weaving operation.

It is preferable that the distances between the tip and the base metal at the reference end point a and the weaving end points b to e satisfy the following conditions respectively with respect to the distance between the tip and the base metal set in advance.

Reference end point a: 20% to 45%
Weaving end point b: 50% to 80%

Weaving end point c: 100% to 120%
Weaving end point d: 100% to 120%
Weaving end point e: 80% to 100%

Here, the distance between the tip and the base metal set in advance is, for example, 10 mm to 40 mm as described above.

In the case where the distance between the tip and the base metal exceeds the upper limit of the above conditions, sufficient penetration may not be obtained. In addition, in the case where the distance between the tip and the base metal is lower than the lower limit of the above conditions, a good bead appearance or an equal leg length may not be obtained, and good weldability may not be obtained.

<Moving Speed During Weaving Operation>

It is preferred that the moving speed from the reference end point a to the weaving end point b is 250 cm/min to 450 cm/min, the moving speed from the weaving end point b to the weaving end point c is 300 cm/min to 500 cm/min, the moving speed from the weaving end point c to the weaving end point d is 250 cm/min to 450 cm/min, the moving speed from the weaving end point d to the weaving end point e is 350 cm/min to 550 cm/min, and the moving speed from the weaving end point e to the reference end point a is 150 cm/min to 350 cm/min, and a stop time of 200 ms or less is provided at each fixed end point. The case where the stop time is 0 ms (that is, the case of not stopping) is also included.

In the case where the moving speed exceeds the upper limit of the above conditions, lack of penetration may occur, or a good bead appearance may not be obtained. On the other hand, in the case where the moving speed is lower than the lower limit of the above conditions, a good bead appearance or equal leg length may not be obtained, and good weldability may not be obtained. In addition, in the case where the stop time exceeds 200 ms, a good bead appearance or equal leg length may not be obtained, and good weldability may not be obtained.

<Movement Angle Between Fixed End Points During Weaving Operation>

Figure 6:
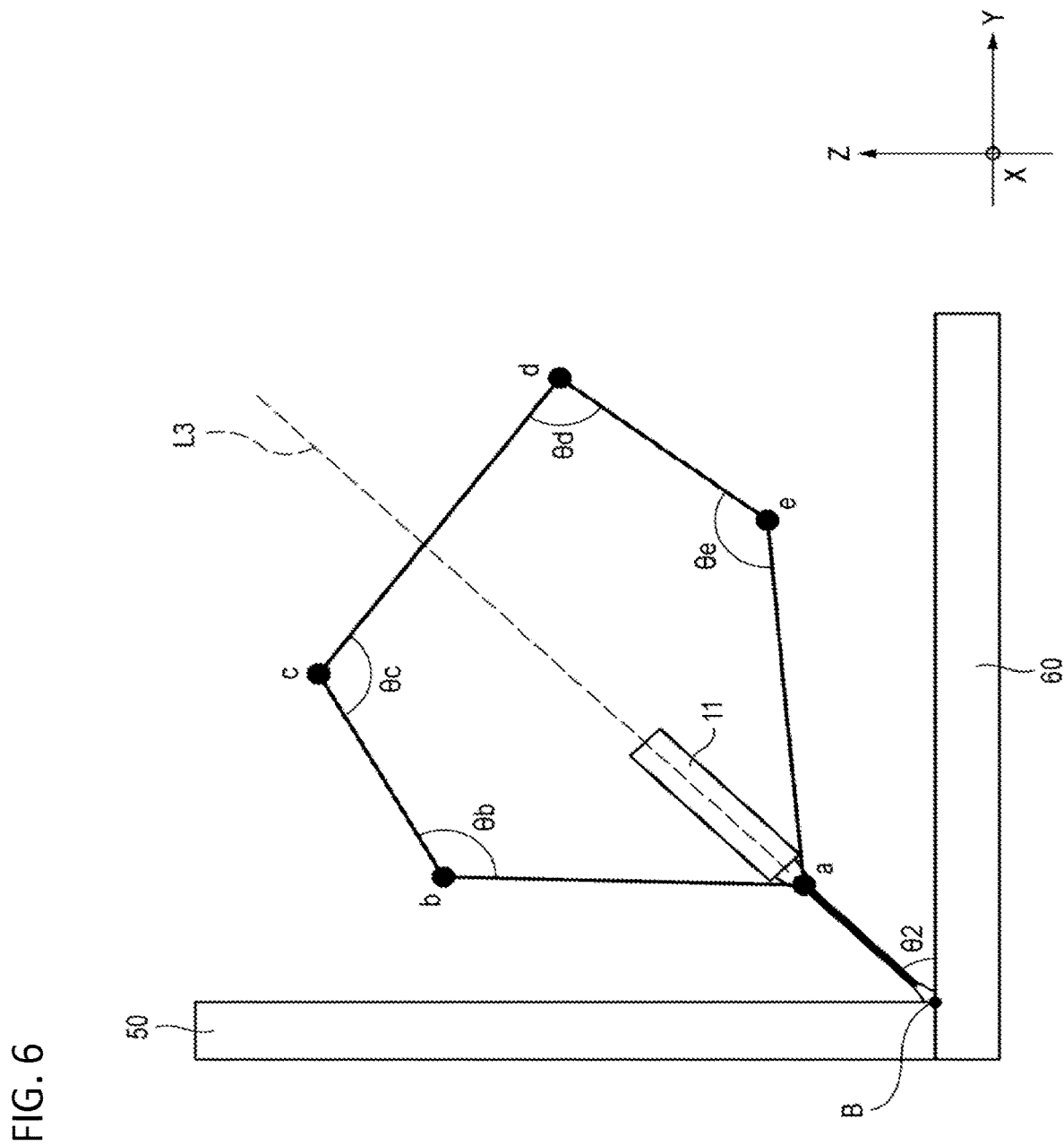
FIG. 6 is a schematic view for illustrating interior angles $\theta_b$ to $\theta_e$ at weaving end points b to e in horizontal fillet welding in the present embodiment, viewed from a welding direction.

It is preferable that interior angles $\theta_b$ to $\theta_e$ at the weaving end points b to e in the pentagon formed by the reference end point a, the weaving end point b, the weaving end point c, the weaving end point d, and the weaving end point e satisfy the following conditions respectively (see FIG. 6).

Interior angle $\theta_b$ at weaving end point b: 130° to 140°
Interior angle $\theta_c$ at weaving end point c: 60° to 90°
Interior angle $\theta_d$ at weaving end point d: 60° to 90°
Interior angle $\theta_e$ at weaving end point e: 130° to 140°

The interior angle $\theta_a$ at the reference end point a is calculated by $\theta_a = 540° - \theta_b - \theta_c - \theta_d - \theta_e$. In the case where the interior angles $\theta_b$ to $\theta_e$ do not satisfy any of the above conditions, a good bead appearance may be difficult to be obtained, and weld defects such as undercut and overlap may not be prevented, or good weldability may not be obtained.

Further, it is particularly preferred that the interior angle at the weaving end point b is equal to the interior angle at the weaving end point e and the interior angle at the weaving end point c is equal to the interior angle at the weaving end point d, because a better bead appearance is obtained and more equal leg length is easily obtained.

<Weaving Trajectory>

Figure 7:
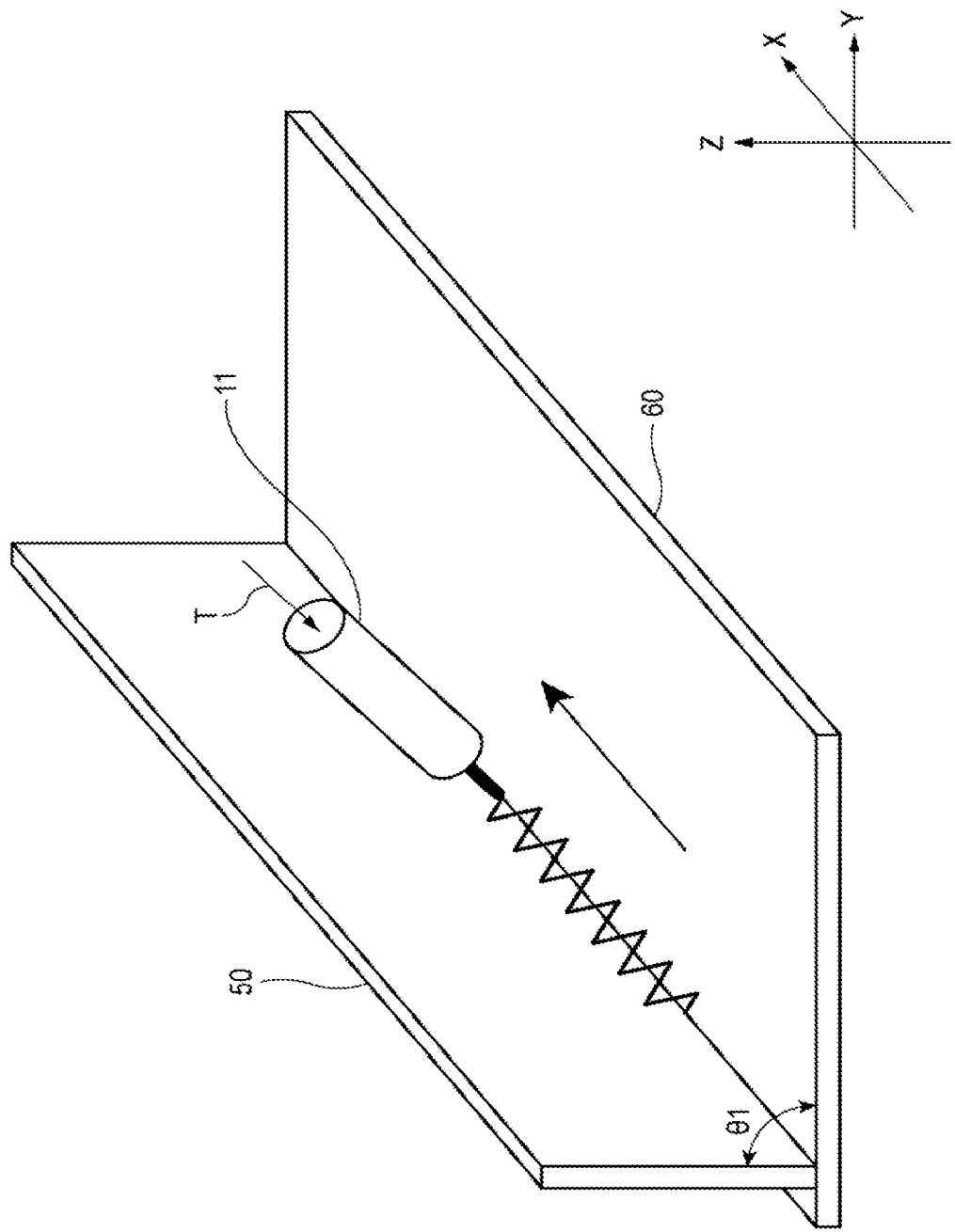
FIG. 7 is a perspective view for illustrating an example of a weaving operation in the related art.
Figure 8:
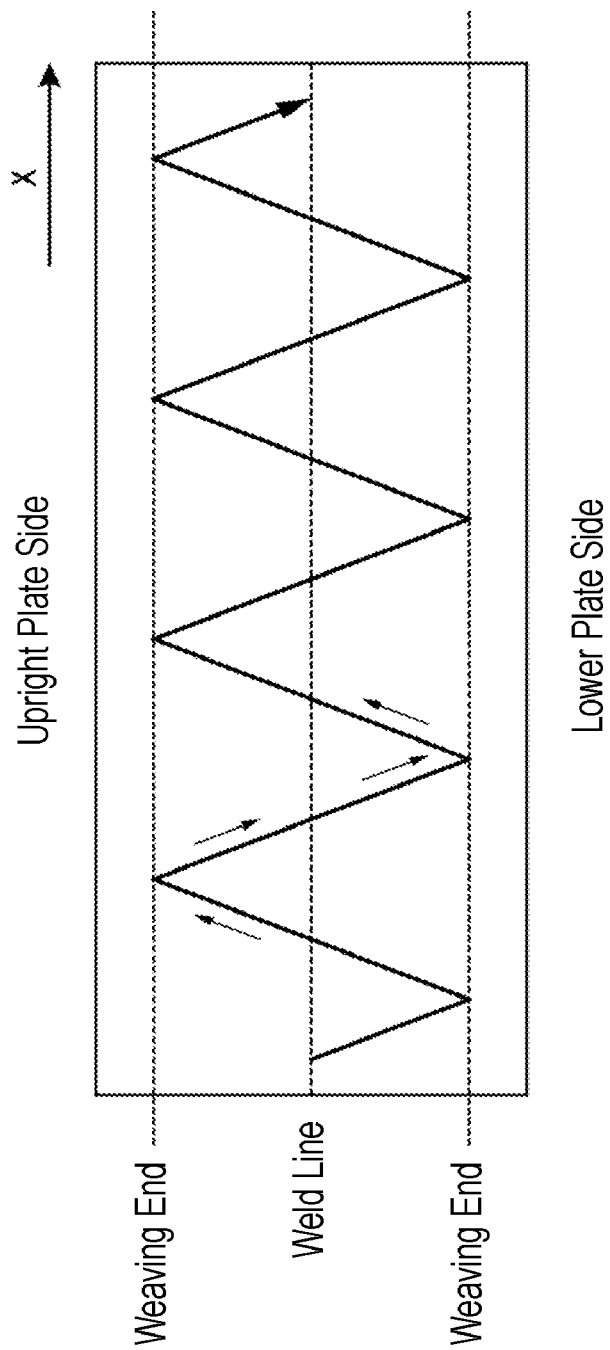
FIG. 8 is a view of the weaving operation in the related art, viewed from direction T in FIG. 7.

The weaving trajectory adopted in the present embodiment is described. In the present embodiment, the weaving trajectory is not particularly limited, and even a weaving trajectory in the related art has a sufficient effect. Here, the weaving trajectory in the related art is the following method in which horizontal fillet welding is taken as an example: as shown in FIG. 7 and FIG. 8, the welding torch 11 advances so as to alternately move to the upright plate 50 side and the lower plate 60 side across the welding direction X and always swings toward the front of the welding direction X (this weaving is referred to as "general weaving" in Examples described later). An amplitude and wavelength of the weaving trajectory are determined by frequency and an amplitude of the weaving operation, and a welding speed. In the present embodiment, the frequency and the amplitude of the weaving operation are not particularly limited.

Figure 9:
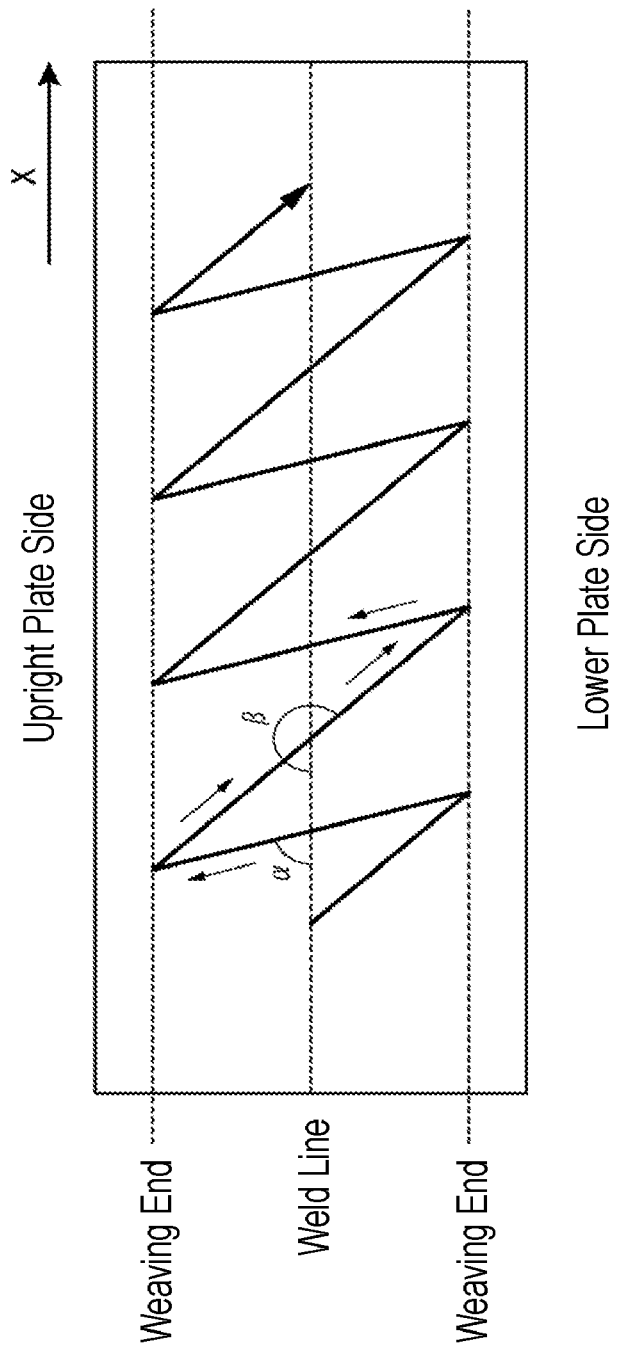
FIG. 9 is a view of a preferred weaving operation in the present embodiment, viewed from direction T in FIG. 3.

However, in the present embodiment of horizontal fillet welding, it is preferable that the weaving trajectory is made such that the welding wire tip of the welding torch 11 moves forward to the lower plate 60 side with respect to the welding direction X, and move backward to the upright plate 50 side with respect to the welding direction X (this weaving is referred to as "special weaving" in Examples described later). FIG. 9 is a view for illustrating an example of the weaving trajectory. As shown in FIG. 9, the welding wire tip moves forward in the welding direction X toward the lower plate side weaving end first, and when the welding wire tip arrives at the lower plate side weaving end, the welding wire tip moves backward in the welding direction X toward the upright plate side weaving end.

That is, in the weaving trajectory in the related art, as shown in FIG. 8, the welding wire tip always swings forward in the welding direction X, but in a preferred weaving trajectory in the present embodiment, operation is made such that the welding wire tip moves forward to the lower plate 60 side and moves backward to the upright plate 50 side. In this way, the welding wire tip repeats the weaving operation of moving to the weaving end on the upright plate side and moving the weaving end on the lower plate side.

Since the welding wire tip moves backward with respect to the welding direction X to the weaving end on the upright plate side, heat generated by an arc is dispersed to the upright plate 50 side and the lower plate 60 side, and cooling power for a molten pool is improved. Further, during the backward movement, molten metal is supported by beads formed during movement to the lower plate 60 side. By improving the cooling power, it is possible to prevent a decrease in viscosity of the molten metal, and the molten metal on the upright plate 50 side is formed on the lower plate 60 side, and is supported by the molten metal having high viscosity by cooling. Therefore, the molten metal on the upright plate 50 side is prevented from dripping by gravity, a large and equal leg length can be maintained, an appropriate bead appearance can be ensured, and weld defects are also prevented. A position of the weaving end (or a distance from the weld line to the weaving end) is determined by setting the weaving width in welding conditions.

In the weaving trajectory shown in FIG. 9 (viewed from the direction T in FIG. 3), the angle formed between the weld line (here, direction opposite to the welding direction X) and the weaving trajectory drawn by the welding wire tip when the welding wire tip moves backward with respect to the welding direction X to the welding end on the upright plate side is referred to as a backward movement angle α. The angle (>180°) formed between the weld line (here, direction opposite to the welding direction X) and the weaving trajectory drawn by the welding wire tip when the welding wire tip moves forward in the welding direction X to the welding end on the lower plate side is referred to as a forward movement angle β. Here, in order that welding advances toward the welding direction X, it is necessary that the backward movement angle α and the forward movement angle β satisfy the following relationship: α>(β−180).

Further, in the weaving trajectory, it is more preferable to make the weaving trajectory such that the upper limit of the backward movement angle α is 85° and the lower limit of the backward movement angle α is 5°. In the case where the backward movement angle α is less than 5°, molten metal on the lower plate 60 side has coagulated when the welding wire tip reaches the weaving end on the upright plate side, and there is a possibility that lack of fusion or slag inclusion occurs. In addition, in the case where the backward movement angle α exceeds 85°, molten metal on the upright plate 50 side easily drips due to gravity, and since an arc length changes depending on a fluctuating molten pool, spatter that scatters during welding may be generated, or lack of fusion may occur or bead appearance may be poor. Further, in order to prevent dripping of the molten metal on the upright plate 50 side due to gravity, achieve the leg length on the upright plate 50 being equal to the leg length on the lower plate 60, and obtain a better bead appearance, it is more preferable that the upper limit of the backward movement angle α is 45° and the lower limit of the backward movement angle α is 10°.

In the present embodiment, the weaving trajectory is preferably made such that the upper limit of the forward movement angle β is 250° and the lower limit of the forward movement angle β is 185°. In the case where the forward movement angle β is less than 185°, balance of a deposited amount per one cycle may be poor, and bead appearance may be poor.

In addition, in the case where the forward movement angle β exceeds 250°, since an effect of cooling power for the molten pool is not obtained, molten metal on the upright plate 50 side easily drips due to gravity, and since the arc length changes depending on a fluctuating molten pool, spatter may be generated, or lack of fusion may occur or bead appearance may be poor. Further, in order to prevent dripping of the molten metal on the upright plate 50 side due to gravity, achieve the leg length on the upright plate 50 being equal to the leg length on the lower plate 60, and obtain a better bead appearance, it is more preferable that the upper limit of the forward movement angle β is 215° and the lower limit of the backward movement angle β is 185°.

<Functional Configuration of Robot Controller>

Figure 10:
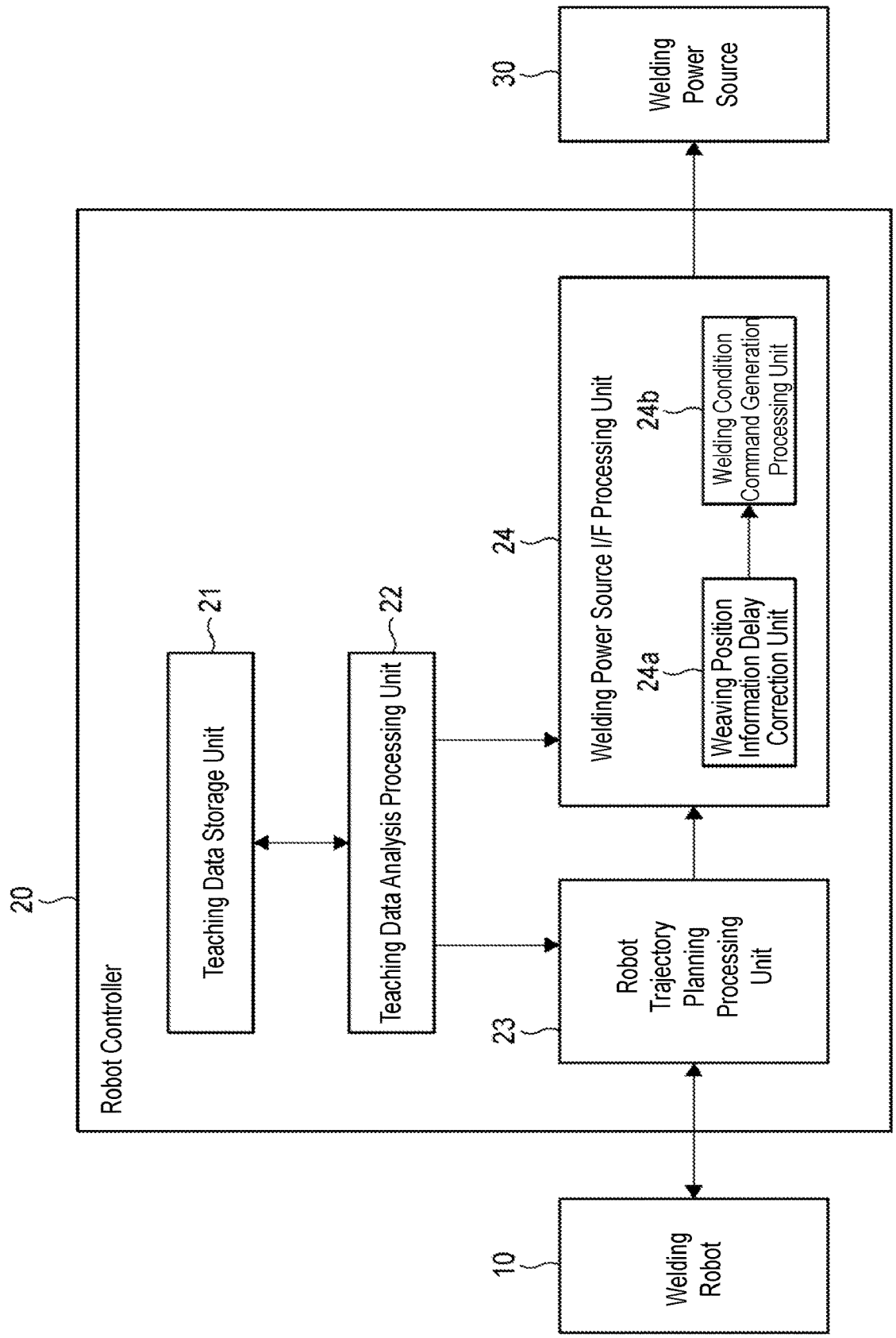
FIG. 10 is a block diagram showing a functional configuration example of a robot controller in the present embodiment.

Next, a functional configuration of the robot controller 20 is described. FIG. 10 is a block diagram showing a functional configuration example of the robot controller 20 in the present embodiment.

As shown in FIG. 10, the robot controller 20 includes a teaching data storage unit 21 that memorizes and stores teaching data created in advance, a teaching data analysis processing unit 22 that analyzes teaching data, a robot trajectory planning processing unit 23 that generates servo command information for instructing a servo driver that controls each shaft of the welding robot 10, and a welding power source interface processing unit (hereinafter, written as a welding power source I/F processing unit) 24 that generates command information for setting a welding current, an arc voltage, and a feeding speed, depending on a welding situation, and outputs the command information to the welding power source 30. The welding power source I/F processing unit 24 includes a weaving position information delay correction unit 24a and a welding condition command generation processing unit 24b.

The teaching data storage unit 21 stores teaching data that includes a fixed operation pattern or the like of the welding robot 10. The teaching data is created in advance by a teaching device (not shown) by a worker. A creation method may be other than the teaching device. For example, teaching data may be created on a personal computer and stored in the teaching data storage unit 21 by wireless communication or wired communication, or the like.

For example, in response to the operation of welding start operation, the teaching data analysis processing unit 22 takes the teaching data from the teaching data storage unit 21 and analyzes the teaching data. Teaching trajectory information and welding condition command information are generated by analyzing the teaching data. The teaching trajectory information is information that includes a fixed trajectory of the welding robot 10 in welding work including a welding speed, weaving conditions, and the like. The welding condition command information is information for performing a command related to the welding current, arc voltage, and feeding speed in the welding work and includes an arc ON/OFF command, and a control command for each welding condition and the like. Then, the teaching data analysis processing unit 22 outputs the generated teaching trajectory information to the robot trajectory planning processing unit 23. The teaching data analysis processing unit 22 outputs the generated welding condition command information to the welding condition command generation processing unit 24b of the welding power source I/F processing unit 24.

The robot trajectory planning processing unit 23 calculates a target position of the welding robot 10 based on the teaching trajectory information input from the teaching data analysis processing unit 22, and generates servo command information for controlling each shaft of the welding robot 10. Then, the robot trajectory planning processing unit 23 outputs the generated servo command information to the welding robot 10. The welding robot 10 performs an operation based on teaching data by the servo command information. The servo command information includes weaving position command information for instructing a position at which the welding wire is weaved, and the robot trajectory planning processing unit 23 outputs the weaving position command information to the weaving position information delay correction unit 24a of the welding power source I/F processing unit 24. In the present embodiment, the robot trajectory planning processing unit 23 is used as an example of a weaving position command unit.

Further, the robot trajectory planning processing unit 23 calculates time until the welding robot 10 actually reaches an instructed position from outputting the servo command information to the welding robot 10 (hereinafter, referred to as weaving delay time). Alternatively, the time is set in advance. A calculation method of the weaving delay time is not limited, and for example, the calculation is performed from a control gain of the servo driver. Then, the robot trajectory planning processing unit 23 outputs the calculated weaving delay time to the weaving position information delay correction unit 24a of the welding power source I/F processing unit 24.

The welding power source I/F processing unit 24 generates the command information for setting the welding current, the arc voltage, the feeding speed and the like, depending on the welding situation, and outputs the generated command information to the welding power source 30.

Here, the weaving position information delay correction unit 24a of the welding power source I/F processing unit 24 acquires the weaving position command information and the weaving delay time information from the robot trajectory planning processing unit 23. Then, the weaving position information delay correction unit 24a corrects the position of the welding wire due to weaving by considering the weaving delay time, and generates information indicating a position where the welding wire is actually present (hereinafter, referred to as actual weaving position information). The weaving position information delay correction unit 24a outputs the generated actual weaving position information to the welding condition command generation processing unit 24b. In the present embodiment, the weaving position information delay correction unit 24a is used as an example of the position information generation unit.

The welding condition command generation processing unit 24b acquires the welding condition command information from the teaching data analysis processing unit 22, and acquires the actual weaving position information from the weaving position information delay correction unit 24a. Then, the welding condition command generation processing unit 24b generates command information for setting the welding conditions in synchronization with the weaving operation of the electrodes based on the acquired welding condition command information and actual weaving position information, and outputs the generated command information to the welding power source 30. The welding power source 30 supplies the welding current, the arc voltage, and the feeding speed depending on the weaving operation based on the command information of the welding conditions.

In the present embodiment, it is preferable to control the welding current, the arc voltage, and the feeding speed at each fixed end point during the weaving operation. By changing (increasing or decreasing) at least one condition of the welding current, the arc voltage, and the feeding speed at each fixed end point, it is possible to ensure penetration or prevent weld defects. Hereinafter, the welding current, the arc voltage, and the feeding speed are described in detail.

<Welding Current>

The welding current is preferably controlled at each fixed end point during the weaving operation. The increase or decrease in the welding current depends on the arc force and affects penetration or bead shape. For example, in the case of horizontal fillet welding, by making the welding current higher than a set welding current at the root portion B, the penetration amount can be further improved. Further, by making the welding current lower than the set welding current at the weaving ends P1 and P2, weld defects such as undercut or overlap can be further prevented.

Specifically, in the case where the total number of the fixed end points is five, a ratio (percentage) of the welding current value at the reference end point a to the set welding current value (set current value) is preferably 105% to 110%. In the case where the ratio is 105% or more of the set current value, penetration in the root portion B can be further ensured. On the other hand, in the case where the ratio is 110% or less of the set current value, the formation of a convex shape of the bead shape can be further prevented, and the bead shape becomes better. In addition, the good equal leg length and weldability are easily obtained.

The set welding current value is not particularly limited, and is appropriately determined depending on size or material of a material to be welded, or the like.

The ratio is preferably 90% to 100% at the weaving end point b, the ratio is preferably 80% to 90% at the weaving end point c, the ratio is preferably 80% to 90% at the weaving end point d, and the ratio is preferably 90% to 100% at the weaving end point e. In the case where these ranges are equal to or higher than the lower limit, it is possible to further prevent occurrence of overlap which is a weld defect caused by bad shape between a bead end part and the base metal. In addition, in the case where these ranges are equal to or lower than the upper limit, it is possible to further prevent occurrence of undercut which is a weld defect caused by generating a groove in the bead end part.

For example, the welding current value during moving from the weaving end point b to the weaving end point c may change linearly, or may hardly change until immediately before reaching the weaving end point c and change sharply as soon as the torch almost reaches the weaving end point c.

<Arc Voltage>

Similarly to the welding current, the arc voltage also depends on the arc force, and affects penetration or the bead shape depending on increase or decrease in the arc force. For example, in the case of horizontal fillet welding, by making the arc voltage at the weaving end P1 on the upright plate side higher than the set arc voltage value (set voltage value), undercut can be further prevented. On the other hand, by making the arc voltage at the weaving end P2 on the lower plate side lower than the set arc voltage value, overlap can be further prevented. In addition, by making the arc voltage in the root portion B lower than the set arc voltage value, the penetration amount can be further improved.

Specifically, in the case where the total number of the fixed end points is five, a ratio (percentage) of the arc voltage value at the reference end point a to the set arc voltage value (set voltage value) is preferably 105% to 110%. In the case where the ratio is 105% or more of the set voltage value, the formation of a convex shape of the bead shape can be further prevented, and the bead shape becomes better. In addition, the good equal leg length and weldability are easily obtained. On the other hand, in the case where the ratio is 110% or less of the set voltage value, penetration in the root portion can be further ensured.

The set arc voltage value is not particularly limited, and is appropriately determined depending on size or material of a material to be welded, or the like.

The ratio is preferably 80% to 90% at the weaving end point b, the ratio is preferably 110% to 120% at the weaving end point c, the ratio is preferably 110% to 120% at the weaving end point d, and the ratio is preferably 80% to 90% at the weaving end point e. In the case where these ranges are equal to or higher than the lower limit, the occurrence of overlap can be further prevented, and in the case where these ranges are equal to or lower than the upper limit, the occurrence of undercut can be further prevented.

For example, the arc voltage value during moving from the weaving end point b to the weaving end point c may change linearly, or may hardly change until immediately before reaching the weaving end point c and change sharply as soon as the torch almost reaches the weaving end point c.

<Feeding Speed>

Similarly to the welding current, the feeding speed also depends on the arc force, and affects penetration or bead shape depending on increase or decrease in the arc force. For example, in the case where the feeding speed increases, the fed welding wire is difficult to be molten, and the welding wire is easy to plunge into the molten pool, so that the penetration amount is further improved. On the other hand, in the case where the feeding speed decreases, the arc length is long and the arc force decreases, so that an effect of preventing undercut at the bead end part is obtained.

Specifically, in the case where the total number of the fixed end points is five, a ratio (percentage) of the feeding speed value at the reference end point a to the set feeding speed value is preferably 105% to 110%. In the case where the ratio is 105% or more of the set feeding speed value, penetration in the root portion B can be further ensured. On the other hand, in the case where the ratio is 110% or less of the set feeding speed value, the formation of a convex shape of the bead shape can be further prevented, and the bead shape becomes better. In addition, the good equal leg length and weldability are easily obtained.

The set feeding speed value is not particularly limited, and is appropriately determined depending on size or material of a material to be welded, or the like.

The ratio is preferably 90% to 100% at the weaving end point b, the ratio is preferably 80% to 90% at the weaving end point c, the ratio is preferably 80% to 90% at the weaving end point d, and the ratio is preferably 90% to 100% at the weaving end point e. In the case where these ranges are equal to or higher than the lower limit, the occurrence of overlap can be further prevented, and in the case where these ranges are equal to or lower than the upper limit, the occurrence of undercut can be further prevented.

For example, the feeding speed value during moving from the weaving end point b to the weaving end point c may change linearly, or may hardly change until immediately before reaching the weaving end point c and change sharply as soon as the torch almost reaches the weaving end point c.

<Weaving Operation and Control Procedure of Welding Conditions at Each Fixed End Point>

Figure 11:
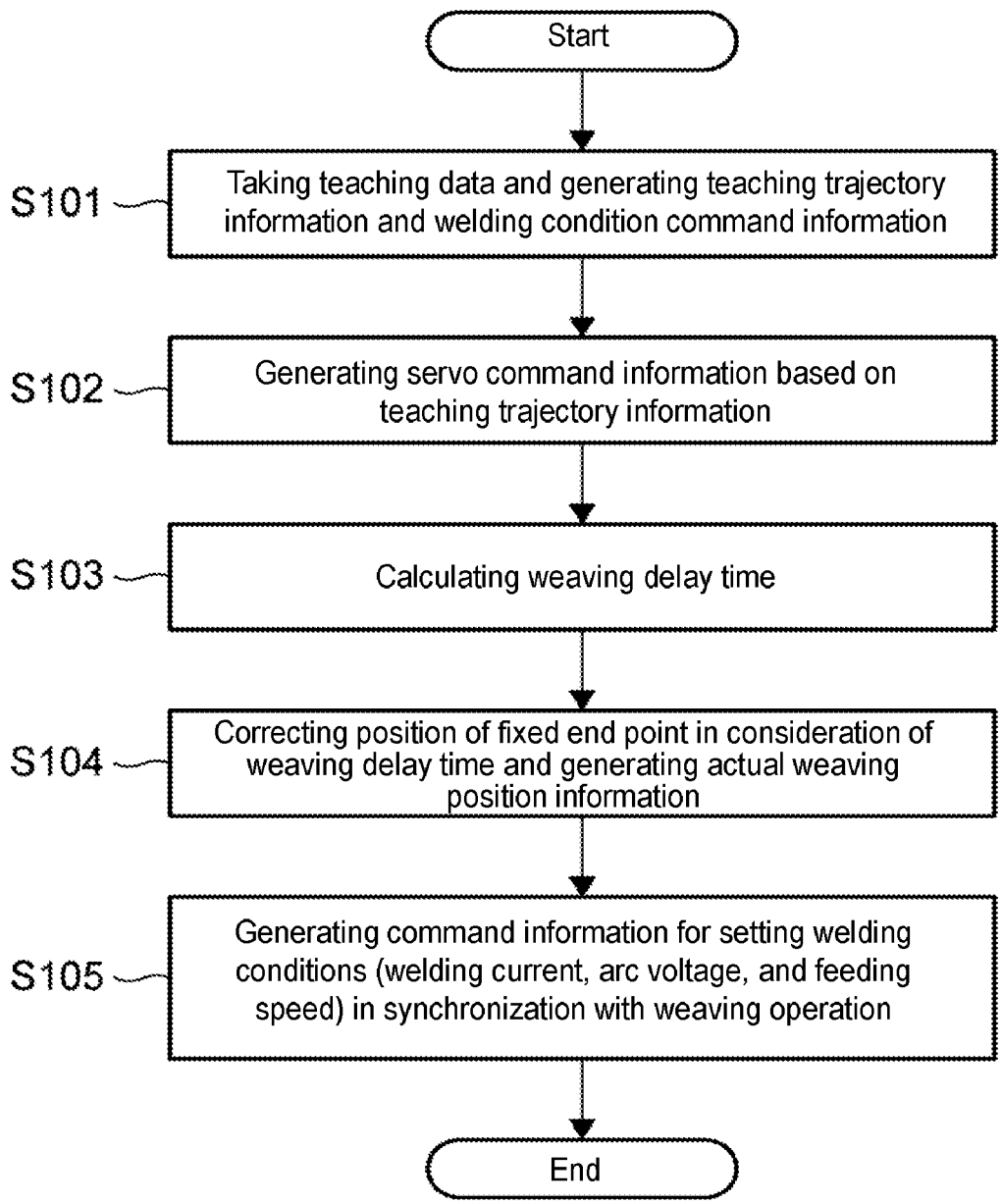
FIG. 11 is a flowchart showing an example of a procedure of controlling welding conditions (welding current, arc voltage, and feeding speed) by the robot controller.

Next, a procedure of controlling the welding conditions (welding current, arc voltage, and feeding speed) by the robot controller 20 is described. FIG. 11 is a flowchart showing an example of a procedure of controlling welding conditions (welding current, arc voltage, and feeding speed) by the robot controller 20.

First, when the welding start operation is performed by a worker, the teaching data analysis processing unit 22 takes the teaching data from the teaching data storage unit 21, and analyzes the teaching data to generate teaching trajectory information and welding condition command information (step 101). The generated teaching trajectory information is output to the robot trajectory planning processing unit 23, and the welding condition command information is output to the welding condition command generation processing unit 24b of the welding power source I/F processing unit 24.

Next, the robot trajectory planning processing unit 23 calculates a target position of the welding robot 10 based on the teaching trajectory information input from the teaching data analysis processing unit 22, and generates servo command information (step 102). Then, the robot trajectory planning processing unit 23 outputs the generated servo command information to the welding robot 10, and also outputs the weaving position command information including position information of the fixed end point in one cycle of weaving to the weaving position information delay correction unit 24a of the welding power source I/F processing unit 24. Then, the robot trajectory planning processing unit 23 calculates weaving delay time (step 103), outputs information of the calculated weaving delay time to the weaving position information delay correction unit 24a of the welding power source I/F processing unit 24.

Next, the weaving position information delay correction unit 24a acquires the weaving position command information (including a position of the fixed end point in one cycle of weaving) and the information of the weaving delay time from the robot trajectory planning processing unit 23, corrects the position of each fixed end point due to weaving in consideration of the weaving delay time, and generates the actual weaving position information (step 104). The generated actual weaving position information is output to the welding condition command generation processing unit 24b of the welding power source I/F processing unit 24.

Next, the welding condition command generation processing unit 24b acquires the welding condition command information from the teaching data analysis processing unit 22, and also acquires the actual weaving position information from the weaving position information delay correction unit 24a, and generates command information for setting various welding conditions, namely a welding current, an arc voltage, a feeding speed, and the like, in synchronization with the welding wire weaving operation (step 105). The generated command information is output to the welding power source 30. The welding power source 30 supplies the welding current, the arc voltage, the feeding speed and the like at the position of the fixed end point in weaving based on the command information. Then, the processing flow ends.

<Welding Construction Conditions>

In the present embodiment, the torch angle $\theta_2$ is not particularly limited, and is preferably set in a range of 30° to 60° from a surface of one material to be welded (for example, from the lower plate 60 in the case of horizontal fillet welding). In the case where the torch angle falls within this range, a good bead shape with an equal leg length is easily obtained. It is more preferable that the torch angle $\theta_2$ is 40° to 50° since the effect described above is more easily obtained.

Figure 12:
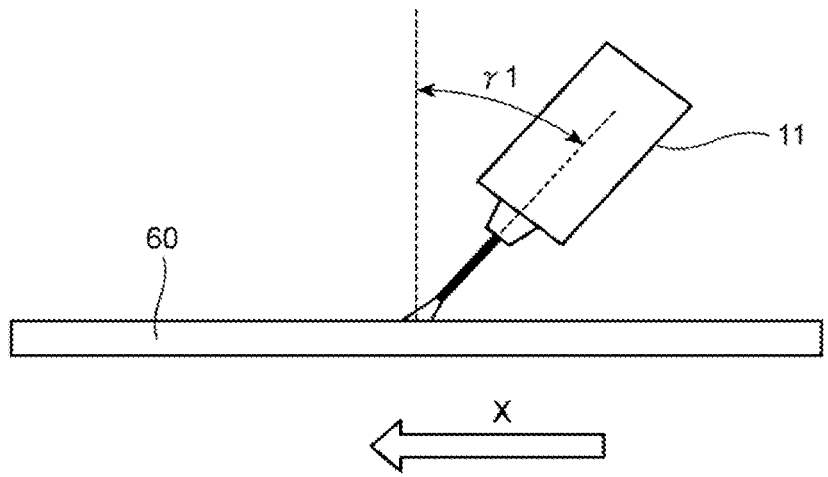
FIG. 12 is a diagram for illustrating an example of a push angle.
Figure 13:
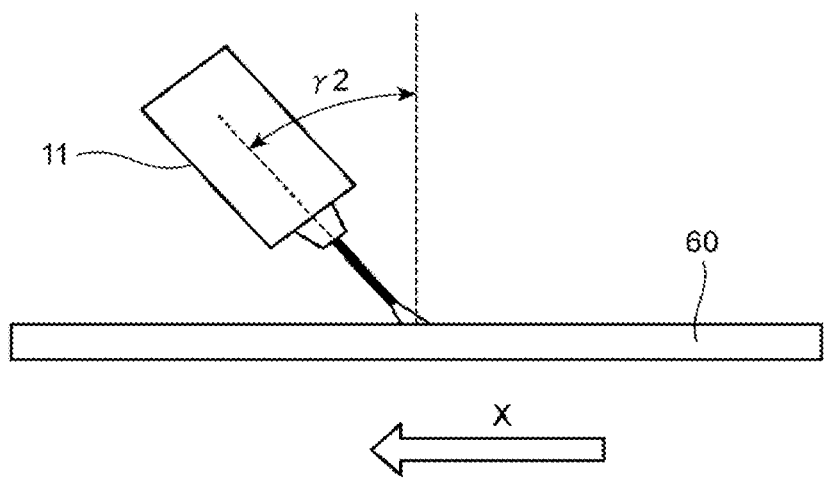
FIG. 13 is a diagram for illustrating an example of a drag angle.

In the present embodiment, as necessary, the welding torch 11 may be inclined with respect to the welding direction X (that is, the welding wire is inclined), and a push angle or a drag angle may be given. FIG. 12 and FIG. 13 are diagrams for illustrating an example of a push angle γ1 and a drag angle γ2, respectively. Although angles thereof are not particularly limited, in order to further improve the bead shape and the penetration amount, it is preferable that the push angle or the drug angle are 30° or less from a bottom surface (from the lower plate 60 in the horizontal fillet welding). It can be said that the case where the push angle is 30° or less from the bottom surface is more preferable from the viewpoint of obtaining the penetration amount, and the case where the drag angle is 30° or less from the bottom surface is more preferable from the viewpoint of obtaining a good bead shape.

EXAMPLES

Hereinafter, the present invention is described in more detail with reference to Examples, but the present invention is not limited to these Examples, and can be carried out with changes within the scope of the present invention, and all of which are included in the technical scope of the present invention.

Tables 1 to 4 show weaving operation conditions (weaving operation conditions No. W1 to No. W40) applied in the Examples. These weaving operation conditions were applied, and welding was performed under the welding conditions shown below. Welding conditions other than the kind of the welding wire, the wire diameter, the kind of the base metal, and the weaving operation conditions are fixed in all of Examples and Comparative Examples. The welding conditions described here are merely an example, and welding conditions in the present embodiment are not limited to the following welding conditions.

<Welding Wire>

Material: a flux-cored wire (FCW), and corresponding to JIS Z3313 T 49J 0 T1-1 C A-U (old YFW-C50DR)

Wire diameter: 1.2 mm

<Base Metal>
  Material: SM490A
<Welding Conditions>
  Set current value: 260 A
  Set voltage value: 30 V
  Set feeding speed value: 12.8 m/min
  Set distance between tip and base metal: 22 mm
  Shielding gas: 100% $CO_2$
  Target leg length: 9 mm or more
  Weaving width: 6 mm In Tables 1 to 4, "-" other than "-" in the column of Distance between tip and base metal at the point b and the point d in the weaving operation condition No. W40 indicates the case where the corresponding conditions are not applied. Further, the distance between the tip and the base metal at the point b and the point d in the weaving operation condition No. W40 can be changed depending on the amplitude because the amplitude during weaving was not controlled, and thus, the distance is indicated as "-".

Weaving operation patterns A to H shown in Tables 1 to 4 indicate operation patterns shown in FIG. 14 to FIG. 21, respectively. Specifically, they are as follows.

Figure 14:
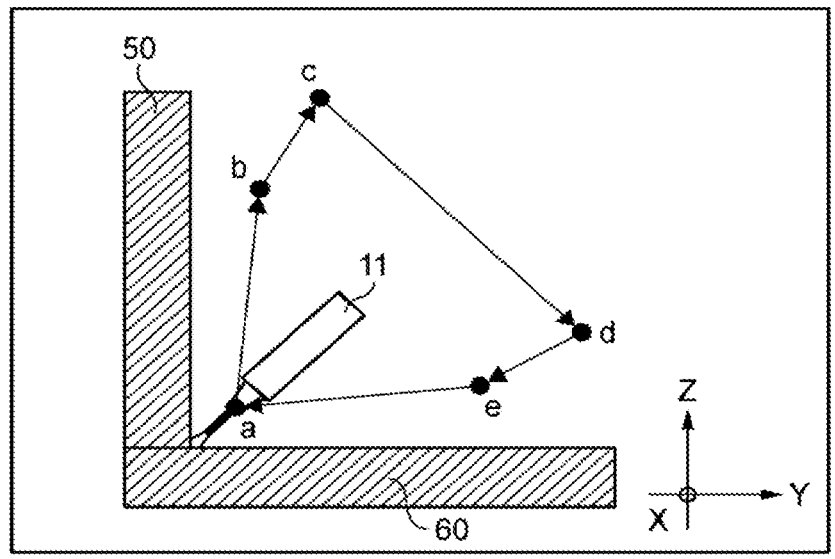
FIG. 14 is a schematic view for illustrating a weaving operation pattern A in Examples described below, viewed from a welding direction.

Weaving operation pattern A: horizontal fillet welding in which the total number of fixed end points is 5 and the weaving operation direction is a direction of advancing from the reference end point a toward the upright plate 50 (a direction of advancing clockwise in FIG. 14) (see FIG. 14)

Figure 15:
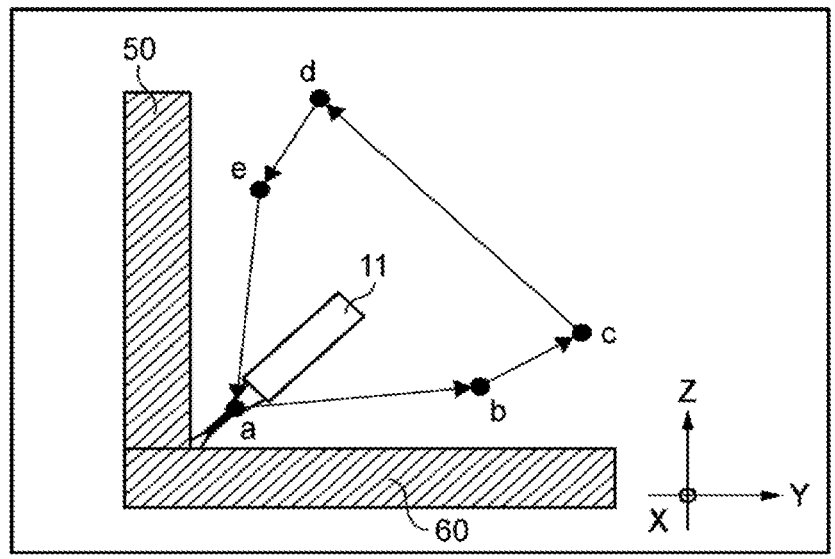
FIG. 15 is a schematic view for illustrating a weaving operation pattern B in Examples described below, viewed from a welding direction.

Weaving operation pattern B: horizontal fillet welding in which the total number of fixed end points is 5 and the weaving operation direction is a direction of advancing from the reference end point a toward the lower plate 60 (a direction of advancing counterclockwise in FIG. 15) (see FIG. 15)

Figure 16:
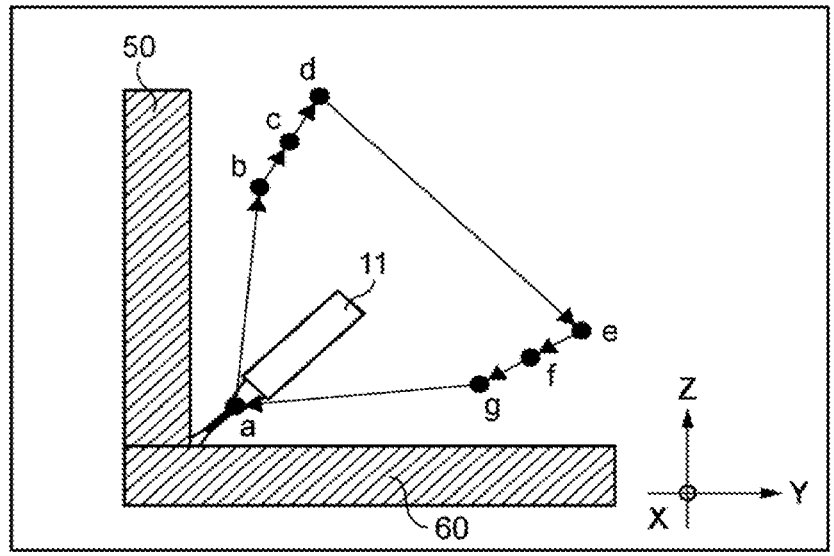
FIG. 16 is a schematic view for illustrating a weaving operation pattern C in Examples described below, viewed from a welding direction.

Weaving operation pattern C: horizontal fillet welding in which the total number of fixed end points is 7 and the weaving operation direction is a direction of advancing from the reference end point a toward the upright plate 50 (a direction of advancing clockwise in FIG. 16) (see FIG. 16)

Figure 17:
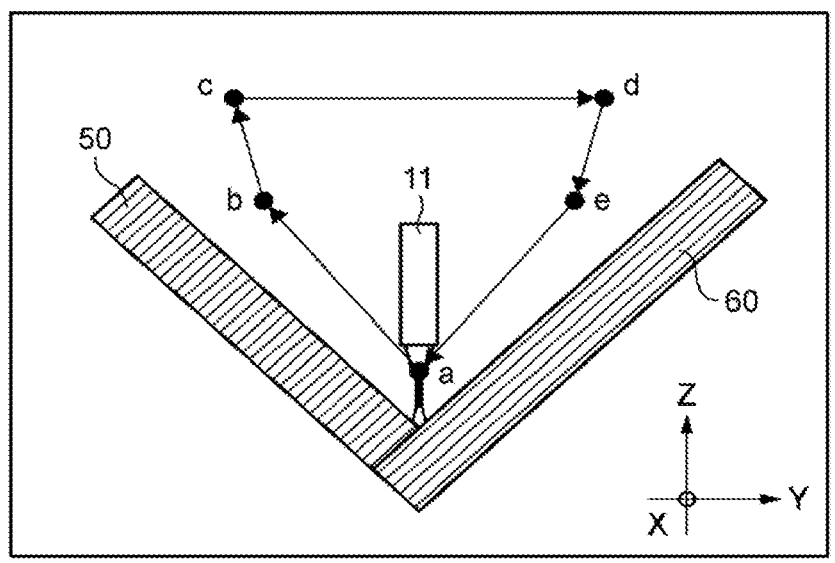
FIG. 17 is a schematic view for illustrating a weaving operation pattern D in Examples described below, viewed from a welding proceeding direction.

Weaving operation pattern D: downward fillet welding in which the total number of fixed end points is 5 and the weaving operation direction is a direction of advancing from the reference end point a toward the upright plate 50 (a direction of advancing clockwise in FIG. 17) (see FIG. 17)

Figure 18:
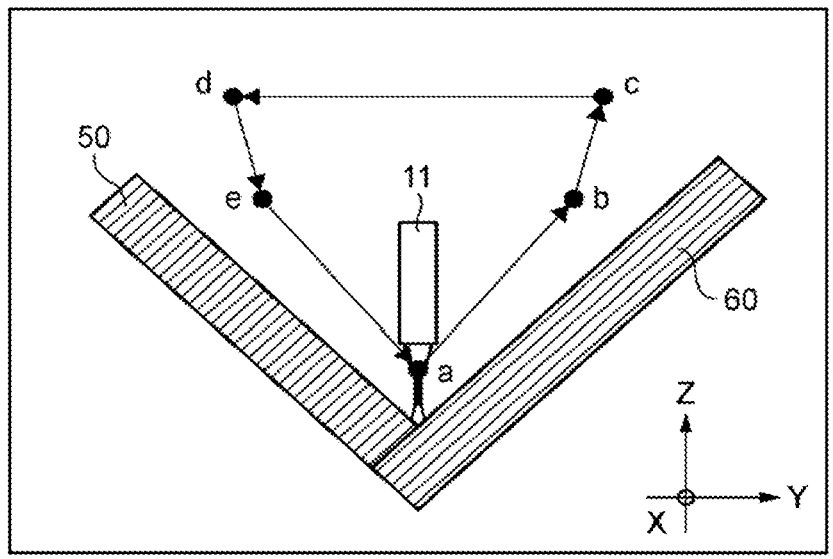
FIG. 18 is a schematic view for illustrating a weaving operation pattern E in Examples described below, viewed from a welding direction.

Weaving operation pattern E: downward fillet welding in which the total number of fixed end points is 5 and the weaving operation direction is a direction of advancing from the reference end point a toward the lower plate 60 (a direction of advancing counterclockwise in FIG. 18) (see FIG. 18)

Figure 19:
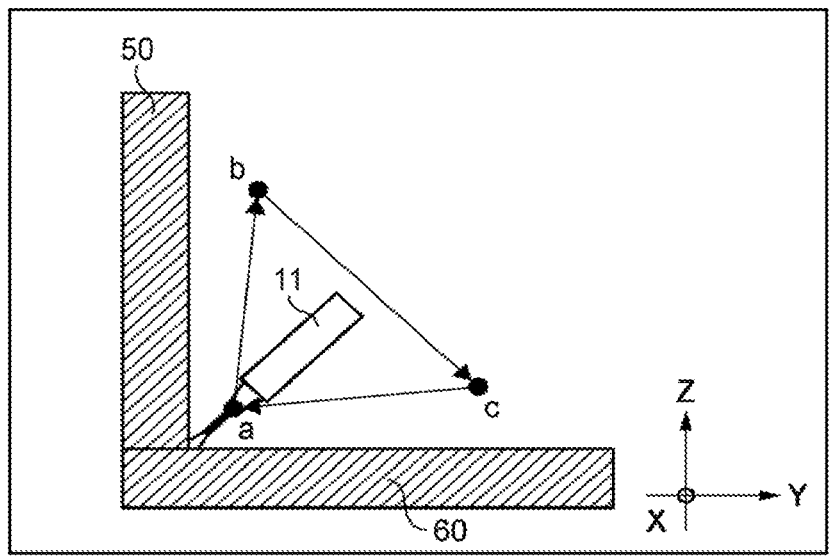
FIG. 19 is a schematic view for illustrating a weaving operation pattern F in Comparative Examples described below, viewed from a welding direction.

Weaving operation pattern F: horizontal fillet welding in which the total number of fixed end points is 3 and the weaving operation direction is a direction of advancing from the reference end point a toward the upright plate 50 (a direction of advancing clockwise in FIG. 19) (see FIG. 19)

Figure 20:
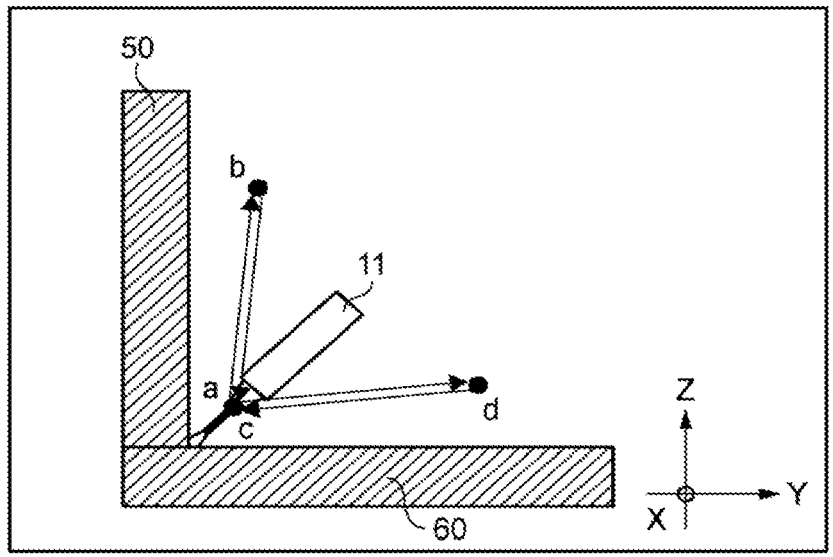
FIG. 20 is a schematic view for illustrating a weaving operation pattern G in Comparative Examples described below, viewed from a welding direction.

Weaving operation pattern G: horizontal fillet welding which moves so as to take a V-shaped trajectory around the reference end point a without taking a polygonal trajectory (see FIG. 20)

Figure 21:
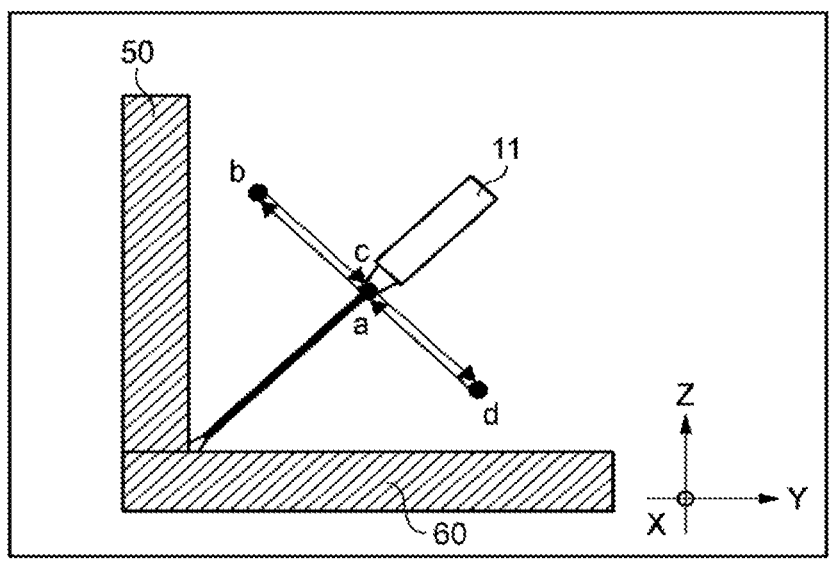
FIG. 21 is a schematic view for illustrating a weaving operation pattern H in Comparative Examples described below, viewed from a welding direction.

Weaving operation pattern H: horizontal fillet welding which moves so as to take a I-shaped trajectory around the reference end point a without taking a polygonal trajectory (see FIG. 21, the weaving operation in the related art)

In any weaving operation pattern, the torch repeatedly moves in the following order: the reference end point a, the weaving end point b, the weaving end point c, the weaving end point d, and the weaving end point e described in each figure (to a weaving end point g in the case of weaving operation pattern C, to the weaving end point c in the case of weaving operation pattern F, and to the weaving end point d in the case of weaving operation patterns G and H).

TABLE 1

| | | Point a (reference point) | | | | | | |
|---|---|---|---|---|---|---|---|---|
| | | Weaving conditions | | | | | | |
| | | Ratio with respect to set value | | | | | Movement conditions | |
| | | | | | Distance | | | |
| Weaving operation condition No. | Weaving operation pattern | Voltage (%) | Current (%) | Feeding speed (%) | between tip and base metal (%) | Stop time [ms] | Moving speed [cm/min] | Movement angle (interior angle) [°] |
| W1 | A | 100 | 100 | 100 | 30 | 100 | 350 | 100 |
| W2 | A | 100 | 100 | 100 | 50 | 300 | 500 | 140 |
| W3 | A | 108 | 108 | 108 | 30 | 100 | 350 | 100 |
| W4 | A | 108 | 108 | 108 | 30 | 200 | 400 | 100 |
| W5 | A | 108 | 108 | 108 | 30 | 0 | 250 | 100 |
| W6 | A | 108 | 108 | 108 | 30 | 250 | 400 | 100 |
| W7 | A | 108 | 108 | 108 | 45 | 100 | 350 | 100 |
| W8 | A | 108 | 108 | 108 | 20 | 100 | 350 | 100 |
| W9 | A | 108 | 108 | 108 | 50 | 100 | 350 | 100 |
| W10 | A | 108 | 108 | 108 | 15 | 100 | 350 | 100 |
| W11 | A | 108 | 108 | 108 | 30 | 200 | 450 | 100 |
| W12 | A | 108 | 108 | 108 | 30 | 0 | 250 | 100 |
| W13 | A | 108 | 108 | 108 | 30 | 200 | 500 | 100 |
| W14 | A | 108 | 108 | 108 | 30 | 0 | 200 | 100 |
| W15 | A | 108 | 108 | 108 | 30 | 100 | 350 | 140 |
| W16 | A | 108 | 108 | 108 | 30 | 100 | 350 | 140 |
| W17 | A | 108 | 108 | 108 | 30 | 100 | 350 | 140 |
| W18 | A | 108 | 100 | 100 | 30 | 100 | 350 | 100 |
| W19 | A | 110 | 100 | 100 | 30 | 100 | 350 | 100 |
| W20 | A | 105 | 100 | 100 | 30 | 100 | 350 | 100 |

TABLE 1-continued

| | | Point b | | | | | |
|---|---|---|---|---|---|---|---|
| | | Weaving conditions | | | | | |
| | | Ratio with respect to set value | | | | | |
| | | | | | Distance | Movement conditions | |
| Weaving operation condition No. | Weaving operation pattern | Voltage (%) | Current (%) | Feeding speed (%) | between tip and base metal (%) | Stop time [ms] | Moving speed [cm/min] | Movement angle (interior angle) [°] |

| Weaving operation condition No. | Weaving operation pattern | Voltage (%) | Current (%) | Feeding speed (%) | Distance between tip and base metal (%) | Stop time [ms] | Moving speed [cm/min] | Movement angle (interior angle) [°] |
|---|---|---|---|---|---|---|---|---|
| W1 | A | 100 | 100 | 100 | 60 | 100 | 400 | 130 |
| W2 | A | 100 | 100 | 100 | 90 | 300 | 550 | 145 |
| W3 | A | 85 | 95 | 95 | 60 | 100 | 400 | 130 |
| W4 | A | 85 | 95 | 95 | 60 | 200 | 450 | 130 |
| W5 | A | 85 | 95 | 95 | 60 | 0 | 350 | 130 |
| W6 | A | 85 | 95 | 95 | 60 | 250 | 450 | 130 |
| W7 | A | 85 | 95 | 95 | 80 | 100 | 400 | 130 |
| W8 | A | 85 | 95 | 95 | 50 | 100 | 400 | 130 |
| W9 | A | 85 | 95 | 95 | 85 | 100 | 400 | 130 |
| W10 | A | 85 | 95 | 95 | 45 | 100 | 400 | 130 |
| W11 | A | 85 | 95 | 95 | 60 | 200 | 500 | 130 |
| W12 | A | 85 | 95 | 95 | 60 | 0 | 300 | 130 |
| W13 | A | 85 | 95 | 95 | 60 | 200 | 550 | 130 |
| W14 | A | 85 | 95 | 95 | 60 | 0 | 250 | 130 |
| W15 | A | 85 | 95 | 95 | 60 | 100 | 400 | 140 |
| W16 | A | 85 | 95 | 95 | 60 | 100 | 400 | 145 |
| W17 | A | 85 | 95 | 95 | 60 | 100 | 400 | 125 |
| W18 | A | 85 | 100 | 100 | 60 | 100 | 400 | 130 |
| W19 | A | 90 | 100 | 100 | 60 | 100 | 400 | 130 |
| W20 | A | 80 | 100 | 100 | 60 | 100 | 400 | 130 |

| | | Point c | | | | | |
|---|---|---|---|---|---|---|---|
| | | Weaving conditions | | | | | |
| | | Ratio with respect to set value | | | | | |
| | | | | | Distance | Movement conditions | |

| Weaving operation condition No. | Weaving operation pattern | Voltage (%) | Current (%) | Feeding speed (%) | Distance between tip and base metal (%) | Stop time [ms] | Moving speed [cm/min] | Movement angle (interior angle) [°] |
|---|---|---|---|---|---|---|---|---|
| W1 | A | 100 | 100 | 100 | 110 | 100 | 350 | 90 |
| W2 | A | 100 | 100 | 100 | 125 | 300 | 500 | 55 |
| W3 | A | 115 | 85 | 85 | 110 | 100 | 350 | 90 |
| W4 | A | 115 | 85 | 85 | 110 | 200 | 400 | 90 |
| W5 | A | 115 | 85 | 85 | 110 | 0 | 400 | 90 |
| W6 | A | 115 | 85 | 85 | 110 | 250 | 400 | 90 |
| W7 | A | 115 | 85 | 85 | 120 | 100 | 350 | 90 |
| W8 | A | 115 | 85 | 85 | 100 | 100 | 350 | 90 |
| W9 | A | 115 | 85 | 85 | 125 | 100 | 350 | 90 |
| W10 | A | 115 | 85 | 85 | 95 | 100 | 350 | 90 |
| W11 | A | 115 | 85 | 85 | 110 | 200 | 450 | 90 |
| W12 | A | 115 | 85 | 85 | 110 | 0 | 250 | 90 |
| W13 | A | 115 | 85 | 85 | 110 | 200 | 500 | 90 |
| W14 | A | 115 | 85 | 85 | 110 | 0 | 200 | 90 |
| W15 | A | 115 | 85 | 85 | 110 | 100 | 350 | 60 |
| W16 | A | 115 | 85 | 85 | 110 | 100 | 350 | 55 |
| W17 | A | 115 | 85 | 85 | 110 | 100 | 350 | 95 |
| W18 | A | 115 | 100 | 100 | 110 | 100 | 350 | 90 |
| W19 | A | 120 | 100 | 100 | 110 | 100 | 350 | 90 |
| W20 | A | 110 | 100 | 100 | 110 | 100 | 350 | 90 |

TABLE 2

| | | Point d | | | | | | |
|---|---|---|---|---|---|---|---|---|
| | | Weaving conditions | | | | | | |
| | | Ratio with respect to set value | | | | | | |
| | | | | | Distance | | Movement conditions | |
| Weaving operation condition No. | Weaving operation pattern | Voltage (%) | Current (%) | Feeding speed (%) | between tip and base metal (%) | Stop time [ms] | Moving speed [cm/min] | Movement angle (interior angle) [°] |
| W1 | A | 100 | 100 | 100 | 110 | 100 | 450 | 90 |
| W2 | A | 100 | 100 | 100 | 125 | 300 | 600 | 55 |
| W3 | A | 85 | 85 | 85 | 110 | 100 | 450 | 90 |
| W4 | A | 85 | 85 | 85 | 110 | 200 | 500 | 90 |
| W5 | A | 85 | 85 | 85 | 110 | 0 | 500 | 90 |
| W6 | A | 85 | 85 | 85 | 110 | 250 | 500 | 90 |
| W7 | A | 85 | 85 | 85 | 120 | 100 | 450 | 90 |
| W8 | A | 85 | 85 | 85 | 100 | 100 | 450 | 90 |
| W9 | A | 85 | 85 | 85 | 125 | 100 | 450 | 90 |
| W10 | A | 85 | 85 | 85 | 95 | 100 | 450 | 90 |
| W11 | A | 85 | 85 | 85 | 110 | 200 | 550 | 90 |
| W12 | A | 85 | 85 | 85 | 110 | 0 | 350 | 90 |
| W13 | A | 85 | 85 | 85 | 110 | 200 | 600 | 90 |
| W14 | A | 85 | 85 | 85 | 110 | 0 | 300 | 90 |
| W15 | A | 85 | 85 | 85 | 110 | 100 | 450 | 60 |
| W16 | A | 85 | 85 | 85 | 110 | 100 | 450 | 55 |
| W17 | A | 85 | 85 | 85 | 110 | 100 | 450 | 95 |
| W18 | A | 85 | 100 | 100 | 110 | 100 | 450 | 90 |
| W19 | A | 120 | 100 | 100 | 110 | 100 | 450 | 90 |
| W20 | A | 110 | 100 | 100 | 110 | 100 | 450 | 90 |

| | | Point e | | | | | | |
|---|---|---|---|---|---|---|---|---|
| | | Weaving conditions | | | | | | |
| | | Ratio with respect to set value | | | | | | |
| | | | | | Distance | | Movement conditions | |
| Weaving operation condition No. | Weaving operation pattern | Voltage (%) | Current (%) | Feeding speed (%) | between tip and base metal (%) | Stop time [ms] | Moving speed [cm/min] | Movement angle (interior angle) [°] |
| W1 | A | 100 | 100 | 100 | 90 | 100 | 250 | 130 |
| W2 | A | 100 | 100 | 100 | 105 | 300 | 400 | 145 |
| W3 | A | 85 | 95 | 95 | 90 | 100 | 250 | 130 |
| W4 | A | 85 | 95 | 95 | 90 | 200 | 300 | 130 |
| W5 | A | 85 | 95 | 95 | 90 | 0 | 200 | 130 |
| W6 | A | 85 | 95 | 95 | 90 | 250 | 300 | 130 |
| W7 | A | 85 | 95 | 95 | 100 | 100 | 250 | 130 |
| W8 | A | 85 | 95 | 95 | 80 | 100 | 250 | 130 |
| W9 | A | 85 | 95 | 95 | 105 | 100 | 250 | 130 |
| W10 | A | 85 | 95 | 95 | 75 | 100 | 250 | 130 |
| W11 | A | 85 | 95 | 95 | 90 | 200 | 350 | 130 |
| W12 | A | 85 | 95 | 95 | 90 | 0 | 150 | 130 |
| W13 | A | 85 | 95 | 95 | 90 | 200 | 400 | 130 |
| W14 | A | 85 | 95 | 95 | 90 | 0 | 100 | 130 |
| W15 | A | 85 | 95 | 95 | 90 | 100 | 250 | 140 |
| W16 | A | 85 | 95 | 95 | 90 | 100 | 250 | 145 |
| W17 | A | 85 | 95 | 95 | 90 | 100 | 250 | 125 |
| W18 | A | 85 | 100 | 100 | 90 | 100 | 250 | 130 |
| W19 | A | 90 | 100 | 100 | 90 | 100 | 250 | 130 |
| W20 | A | 80 | 100 | 100 | 90 | 100 | 250 | 130 |

| | | Point f | | | | | | |
|---|---|---|---|---|---|---|---|---|
| | | Weaving conditions | | | | | | |
| | | Ratio with respect to set value | | | | | | |
| | | | | | Distance | | Movement conditions | |
| Weaving operation condition No. | Weaving operation pattern | Voltage (%) | Current (%) | Feeding speed (%) | between tip and base metal (%) | Stop time [ms] | Moving speed [cm/min] | Movement angle (interior angle) [°] |
| W1 | A | — | — | — | — | — | — | — |
| W2 | A | — | — | — | — | — | — | — |

TABLE 2-continued

| Weaving operation condition No. | Weaving operation pattern | Voltage (%) | Current (%) | Feeding speed (%) | Distance between tip and base metal (%) | Stop time [ms] | Moving speed [cm/min] | Movement angle (interior angle) [°] |
|---|---|---|---|---|---|---|---|---|
| W3 | A | — | — | — | — | — | — | — |
| W4 | A | — | — | — | — | — | — | — |
| W5 | A | — | — | — | — | — | — | — |
| W6 | A | — | — | — | — | — | — | — |
| W7 | A | — | — | — | — | — | — | — |
| W8 | A | — | — | — | — | — | — | — |
| W9 | A | — | — | — | — | — | — | — |
| W10 | A | — | — | — | — | — | — | — |
| W11 | A | — | — | — | — | — | — | — |
| W12 | A | — | — | — | — | — | — | — |
| W13 | A | — | — | — | — | — | — | — |
| W14 | A | — | — | — | — | — | — | — |
| W15 | A | — | — | — | — | — | — | — |
| W16 | A | — | — | — | — | — | — | — |
| W17 | A | — | — | — | — | — | — | — |
| W18 | A | — | — | — | — | — | — | — |
| W19 | A | — | — | — | — | — | — | — |
| W20 | A | — | — | — | — | — | — | — |

Point g

Weaving conditions

Ratio with respect to set value

| Weaving operation condition No. | Weaving operation pattern | Voltage (%) | Current (%) | Feeding speed (%) | Distance between tip and base metal (%) | Stop time [ms] | Moving speed [cm/min] | Movement angle (interior angle) [°] |
|---|---|---|---|---|---|---|---|---|
| W1 | A | — | — | — | — | — | — | — |
| W2 | A | — | — | — | — | — | — | — |
| W3 | A | — | — | — | — | — | — | — |
| W4 | A | — | — | — | — | — | — | — |
| W5 | A | — | — | — | — | — | — | — |
| W6 | A | — | — | — | — | — | — | — |
| W7 | A | — | — | — | — | — | — | — |
| W8 | A | — | — | — | — | — | — | — |
| W9 | A | — | — | — | — | — | — | — |
| W10 | A | — | — | — | — | — | — | — |
| W11 | A | — | — | — | — | — | — | — |
| W12 | A | — | — | — | — | — | — | — |
| W13 | A | — | — | — | — | — | — | — |
| W14 | A | — | — | — | — | — | — | — |
| W15 | A | — | — | — | — | — | — | — |
| W16 | A | — | — | — | — | — | — | — |
| W17 | A | — | — | — | — | — | — | — |
| W18 | A | — | — | — | — | — | — | — |
| W19 | A | — | — | — | — | — | — | — |
| W20 | A | — | — | — | — | — | — | — |

TABLE 3

Point a (reference point)

Weaving conditions

Ratio with respect to set value

| Weaving operation condition No. | Weaving operation pattern | Voltage (%) | Current (%) | Feeding speed (%) | Distance between tip and base metal (%) | Stop time [ms] | Moving speed [cm/min] | Movement angle (interior angle) [°] |
|---|---|---|---|---|---|---|---|---|
| W21 | A | 115 | 100 | 100 | 30 | 100 | 350 | 100 |
| W22 | A | 100 | 100 | 100 | 30 | 100 | 350 | 100 |
| W23 | A | 100 | 108 | 100 | 30 | 100 | 350 | 100 |
| W24 | A | 100 | 110 | 100 | 30 | 100 | 350 | 100 |
| W25 | A | 100 | 105 | 100 | 30 | 100 | 350 | 100 |
| W26 | A | 100 | 115 | 100 | 30 | 100 | 350 | 100 |
| W27 | A | 100 | 105 | 100 | 30 | 100 | 350 | 100 |
| W28 | A | 100 | 100 | 108 | 30 | 100 | 350 | 100 |
| W29 | A | 100 | 100 | 110 | 30 | 100 | 350 | 100 |
| W30 | A | 100 | 100 | 105 | 30 | 100 | 350 | 100 |
| W31 | A | 100 | 100 | 115 | 30 | 100 | 350 | 100 |

TABLE 3-continued

| | | | | | | | | |
|---|---|---|---|---|---|---|---|---|
| W32 | A | 100 | 100 | 100 | 30 | 100 | 350 | 100 |
| W33 | B | 108 | 108 | 108 | 30 | 100 | 350 | 100 |
| W34 | C | 108 | 108 | 108 | 30 | 100 | 350 | 100 |
| W35 | D | 108 | 108 | 108 | 30 | 100 | 350 | 100 |
| W36 | E | 108 | 108 | 108 | 30 | 100 | 350 | 100 |
| W37 | A | 100 | 100 | 100 | 60 | 100 | 350 | 100 |
| W38 | F | 100 | 100 | 100 | 30 | 100 | 350 | 90 |
| W39 | G | 100 | 100 | 100 | 30 | 100 | 350 | — |
| W40 | H | 100 | 100 | 100 | 100 | 0 | 250 | — |

Point b

| | | Weaving conditions | | | | | Movement conditions | |
|---|---|---|---|---|---|---|---|---|
| | | Ratio with respect to set value | | | | | | |
| Weaving operation condition No. | Weaving operation pattern | Voltage (%) | Current (%) | Feeding speed (%) | Distance between tip and base metal (%) | Stop time [ms] | Moving speed [cm/min] | Movement angle (interior angle) [°] |
| W21 | A | 95 | 100 | 100 | 60 | 100 | 400 | 130 |
| W22 | A | 75 | 100 | 100 | 60 | 100 | 400 | 130 |
| W23 | A | 100 | 95 | 100 | 60 | 100 | 400 | 130 |
| W24 | A | 100 | 100 | 100 | 60 | 100 | 400 | 130 |
| W25 | A | 100 | 90 | 100 | 60 | 100 | 400 | 130 |
| W26 | A | 100 | 105 | 100 | 60 | 100 | 400 | 130 |
| W27 | A | 100 | 90 | 100 | 60 | 100 | 400 | 130 |
| W28 | A | 100 | 100 | 95 | 60 | 100 | 400 | 130 |
| W29 | A | 100 | 100 | 100 | 60 | 100 | 400 | 130 |
| W30 | A | 100 | 100 | 90 | 60 | 100 | 400 | 130 |
| W31 | A | 100 | 100 | 105 | 60 | 100 | 400 | 130 |
| W32 | A | 100 | 100 | 85 | 60 | 100 | 400 | 130 |
| W33 | B | 85 | 95 | 95 | 60 | 100 | 400 | 130 |
| W34 | C | 85 | 95 | 95 | 60 | 100 | 400 | 150 |
| W35 | D | 85 | 95 | 95 | 60 | 100 | 400 | 130 |
| W36 | E | 85 | 95 | 95 | 60 | 100 | 400 | 130 |
| W37 | A | 100 | 100 | 100 | 50 | 100 | 400 | 130 |
| W38 | F | 100 | 100 | 100 | 110 | 150 | 350 | 45 |
| W39 | G | 100 | 100 | 100 | 110 | 150 | 350 | — |
| W40 | H | 100 | 100 | 100 | — | 200 | 250 | — |

Point c

| | | Weaving conditions | | | | | Movement conditions | |
|---|---|---|---|---|---|---|---|---|
| | | Ratio with respect to set value | | | | | | |
| Weaving operation condition No. | Weaving operation pattern | Voltage (%) | Current (%) | Feeding speed (%) | Distance between tip and base metal (%) | Stop time [ms] | Moving speed [cm/min] | Movement angle (interior angle) [°] |
| W21 | A | 125 | 100 | 100 | 110 | 100 | 350 | 90 |
| W22 | A | 105 | 100 | 100 | 110 | 100 | 350 | 90 |
| W23 | A | 100 | 85 | 100 | 110 | 100 | 350 | 90 |
| W24 | A | 100 | 90 | 100 | 110 | 100 | 350 | 90 |
| W25 | A | 100 | 80 | 100 | 110 | 100 | 350 | 90 |
| W26 | A | 100 | 95 | 100 | 110 | 100 | 350 | 90 |
| W27 | A | 100 | 80 | 100 | 110 | 100 | 350 | 90 |
| W28 | A | 100 | 100 | 85 | 110 | 100 | 350 | 90 |
| W29 | A | 100 | 100 | 90 | 110 | 100 | 350 | 90 |
| W30 | A | 100 | 100 | 80 | 110 | 100 | 350 | 90 |
| W31 | A | 100 | 100 | 95 | 110 | 100 | 350 | 90 |
| W32 | A | 100 | 100 | 75 | 110 | 100 | 350 | 90 |
| W33 | B | 115 | 85 | 85 | 110 | 100 | 350 | 90 |
| W34 | C | 85 | 95 | 95 | 60 | 100 | 400 | 160 |
| W35 | D | 115 | 85 | 85 | 110 | 100 | 350 | 90 |
| W36 | E | 115 | 85 | 85 | 110 | 100 | 350 | 90 |
| W37 | A | 100 | 100 | 100 | 90 | 100 | 350 | 90 |
| W38 | F | 100 | 100 | 100 | 110 | 150 | 350 | 45 |
| W39 | G | 100 | 100 | 100 | 30 | 100 | 350 | — |
| W40 | H | 100 | 100 | 100 | 100 | 0 | 250 | — |

TABLE 4

Point d

Weaving conditions

Ratio with respect to set value

| Weaving operation condition No. | Weaving operation pattern | Voltage (%) | Current (%) | Feeding speed (%) | Distance between tip and base metal (%) | Stop time [ms] | Moving speed [cm/min] | Movement angle (interior angle) [°] |
|---|---|---|---|---|---|---|---|---|
| W21 | A | 125 | 100 | 100 | 110 | 100 | 450 | 90 |
| W22 | A | 110 | 100 | 100 | 110 | 100 | 450 | 90 |
| W23 | A | 100 | 85 | 100 | 110 | 100 | 450 | 90 |
| W24 | A | 100 | 90 | 100 | 110 | 100 | 450 | 90 |
| W25 | A | 100 | 80 | 100 | 110 | 100 | 450 | 90 |
| W26 | A | 100 | 95 | 100 | 110 | 100 | 450 | 90 |
| W27 | A | 100 | 80 | 100 | 110 | 100 | 450 | 90 |
| W28 | A | 100 | 100 | 85 | 110 | 100 | 450 | 90 |
| W29 | A | 100 | 100 | 90 | 110 | 100 | 450 | 90 |
| W30 | A | 100 | 100 | 80 | 110 | 100 | 450 | 90 |
| W31 | A | 100 | 100 | 95 | 110 | 100 | 450 | 90 |
| W32 | A | 100 | 100 | 75 | 110 | 100 | 450 | 90 |
| W33 | B | 85 | 85 | 85 | 110 | 100 | 450 | 90 |
| W34 | C | 115 | 85 | 85 | 110 | 100 | 350 | 90 |
| W35 | D | 85 | 85 | 85 | 110 | 100 | 450 | 90 |
| W36 | E | 85 | 85 | 85 | 110 | 100 | 450 | 90 |
| W37 | A | 100 | 100 | 100 | 90 | 100 | 450 | 90 |
| W38 | F | — | — | — | — | — | — | — |
| W39 | G | 100 | 100 | 100 | 110 | 150 | 350 | — |
| W40 | H | 100 | 100 | 100 | — | 200 | 250 | — |

Point e

Weaving conditions

Ratio with respect to set value

| Weaving operation condition No. | Weaving operation pattern | Voltage (%) | Current (%) | Feeding speed (%) | Distance between tip and base metal (%) | Stop time [ms] | Moving speed [cm/min] | Movement angle (interior angle) [°] |
|---|---|---|---|---|---|---|---|---|
| W21 | A | 95 | 100 | 100 | 90 | 100 | 250 | 130 |
| W22 | A | 80 | 100 | 100 | 90 | 100 | 250 | 130 |
| W23 | A | 100 | 95 | 100 | 90 | 100 | 250 | 130 |
| W24 | A | 100 | 100 | 100 | 90 | 100 | 250 | 130 |
| W25 | A | 100 | 90 | 100 | 90 | 100 | 250 | 130 |
| W26 | A | 100 | 105 | 100 | 90 | 100 | 250 | 130 |
| W27 | A | 100 | 90 | 100 | 90 | 100 | 250 | 130 |
| W28 | A | 100 | 100 | 95 | 90 | 100 | 250 | 130 |
| W29 | A | 100 | 100 | 100 | 90 | 100 | 250 | 130 |
| W30 | A | 100 | 100 | 90 | 90 | 100 | 250 | 130 |
| W31 | A | 100 | 100 | 105 | 90 | 100 | 250 | 130 |
| W32 | A | 100 | 100 | 85 | 90 | 100 | 250 | 130 |
| W33 | B | 85 | 95 | 95 | 90 | 100 | 250 | 130 |
| W34 | C | 85 | 85 | 85 | 110 | 100 | 450 | 90 |
| W35 | D | 85 | 95 | 95 | 90 | 100 | 250 | 130 |
| W36 | E | 85 | 95 | 95 | 90 | 100 | 250 | 130 |
| W37 | A | 100 | 100 | 100 | 50 | 100 | 250 | 130 |
| W38 | F | — | — | — | — | — | — | — |
| W39 | G | — | — | — | — | — | — | — |
| W40 | H | — | — | — | — | — | — | — |

Point f

Weaving conditions

Ratio with respect to set value

| Weaving operation condition No. | Weaving operation pattern | Voltage (%) | Current (%) | Feeding speed (%) | Distance between tip and base metal (%) | Stop time [ms] | Moving speed [cm/min] | Movement angle (interior angle) [°] |
|---|---|---|---|---|---|---|---|---|
| W21 | A | — | — | — | — | — | — | — |
| W22 | A | — | — | — | — | — | — | — |

TABLE 4-continued

| Weaving operation condition No. | Weaving operation pattern | Voltage (%) | Current (%) | Feeding speed (%) | Distance between tip and base metal (%) | Stop time [ms] | Moving speed [cm/min] | Movement angle (interior angle) [°] |
|---|---|---|---|---|---|---|---|---|
| W23 | A | — | — | — | — | — | — | — |
| W24 | A | — | — | — | — | — | — | — |
| W25 | A | — | — | — | — | — | — | — |
| W26 | A | — | — | — | — | — | — | — |
| W27 | A | — | — | — | — | — | — | — |
| W28 | A | — | — | — | — | — | — | — |
| W29 | A | — | — | — | — | — | — | — |
| W30 | A | — | — | — | — | — | — | — |
| W31 | A | — | — | — | — | — | — | — |
| W32 | A | — | — | — | — | — | — | — |
| W33 | B | — | — | — | — | — | — | — |
| W34 | C | 85 | 95 | 95 | 90 | 100 | 250 | 160 |
| W35 | D | — | — | — | — | — | — | — |
| W36 | E | — | — | — | — | — | — | — |
| W37 | A | — | — | — | — | — | — | — |
| W38 | F | — | — | — | — | — | — | — |
| W39 | G | — | — | — | — | — | — | — |
| W40 | H | — | — | — | — | — | — | — |

Point g

| Weaving operation condition No. | Weaving operation pattern | Weaving conditions — Ratio with respect to set value | | | | Movement conditions | | |
|---|---|---|---|---|---|---|---|---|
| | | Voltage (%) | Current (%) | Feeding speed (%) | Distance between tip and base metal (%) | Stop time [ms] | Moving speed [cm/min] | Movement angle (interior angle) [°] |
| W21 | A | — | — | — | — | — | — | — |
| W22 | A | — | — | — | — | — | — | — |
| W23 | A | — | — | — | — | — | — | — |
| W24 | A | — | — | — | — | — | — | — |
| W25 | A | — | — | — | — | — | — | — |
| W26 | A | — | — | — | — | — | — | — |
| W27 | A | — | — | — | — | — | — | — |
| W28 | A | — | — | — | — | — | — | — |
| W29 | A | — | — | — | — | — | — | — |
| W30 | A | — | — | — | — | — | — | — |
| W31 | A | — | — | — | — | — | — | — |
| W32 | A | — | — | — | — | — | — | — |
| W33 | B | — | — | — | — | — | — | — |
| W34 | C | 85 | 95 | 95 | 90 | 100 | 250 | 150 |
| W35 | D | — | — | — | — | — | — | — |
| W36 | E | — | — | — | — | — | — | — |
| W37 | A | — | — | — | — | — | — | — |
| W38 | F | — | — | — | — | — | — | — |
| W39 | G | — | — | — | — | — | — | — |
| W40 | H | — | — | — | — | — | — | — |

Next, Table 5 and Table 6 show weaving trajectory conditions (kind of weaving, frequency, and special weaving conditions) and evaluation results (penetration performance, bead appearance, equal leg length, weld defect, and weldability). As the kind of weaving, it indicates if it corresponds to the general weaving or special weaving described above. In addition, the case of satisfying the condition of "α>(β−180)" in the special weaving is indicated by "A".

<Evaluation Method>

(Penetration Performance)

A penetration depth was measured from an optical microscope photograph of a cross section of the welded portion, and lack of penetration was determined by visual observation to evaluate the penetration performance. The case where it was evaluated as lack of penetration by visual observation is "C" (poor), the case where it was evaluated as good penetration by visual observation and a penetration depth was less than 0.5 mm is "B" (good), and the case where it was evaluated as good penetration by visual observation and a penetration depth was 0.5 mm or more is "A" (excellent).

(Bead Appearance)

The bead appearance was evaluated by measuring a difference between the maximum value and minimum value of a wave on a bead edge. The case where the difference (absolute value) between the maximum value and the minimum value was 2 mm or more was evaluated as "C" (poor), the case where the difference (absolute value) between the maximum value and the minimum value was 1 mm or more and less than 2 mm was evaluated as "B" (good), and the case where the difference (absolute value) between the maximum value and the minimum value was less than 1 mm was evaluated as "A" (excellent).

(Equal Leg Length)

The difference between the leg length on the upright plate and that on the lower plate was measured to evaluate the equal leg length. The case where the leg length difference was more than 2 mm was evaluated as "C" (bad), the case where the leg length difference was 1 mm or more and 2 mm or less was evaluated as "B" (good), the case where the leg length difference was 0.5 mm or more and less than 1 mm was evaluated as "A" (excellent), and the case where the leg length difference was less than 0.5 mm was evaluated as "AA" (very excellent).

(Weld Defect)

The "weld defect" was determined as follows: a test executor visually observed a bead after completion of welding and observed a macro cross section thereof. Based on the observation of the bead appearance or macro cross section, the case where a weld defect such as undercut or overlap occurred was evaluated as "present", and the normal case where no weld defect occurred was evaluated as "absent".

(Weldability)

Regarding "weldability", in the range of a welding length of 50 mm and a range of 25 mm from a weld line to a lower plate side and a range of 25 mm from a weld line to an upright plate side, the case where an adhering spatter had a size of 1.0 mm or less was evaluated as "A" (excellent), the case where one or more and five or less spatters having a size of more than 1.0 mm were adhered was evaluated as "B" (good), and the case where more than five spatters having a size of more than 1.0 mm was adhered was evaluated as "C" (poor) because this case means that spatter adhesion is significant and weldability is poor.

TABLE 5

| | | Weaving operation | | Weaving trajectory conditions | | | | Evaluation | | | | |
|---|---|---|---|---|---|---|---|---|---|---|---|---|
| | | | | | | Special weaving conditions | | | Bead appearance | Equal leg length | | |
| Welding test No. | condition No. | Construction method | Kind | Frequency (Hz) | α [°] | β [°] | α > (β − 180) | Penetration performance | | | Weld defect | Weldability |
| 1 | W1 | horizontal fillet | general weaving | 1.2 | — | — | — | B | B | A | absent | B |
| 2 | W2 | horizontal fillet | general weaving | 1.2 | — | — | — | B | B | B | absent | B |
| 3 | W3 | horizontal fillet | general weaving | 1.2 | — | — | — | A | A | A | absent | A |
| 4 | W4 | horizontal fillet | general weaving | 1.1 | — | — | — | A | A | A | absent | A |
| 5 | W5 | horizontal fillet | general weaving | 1.3 | — | — | — | A | A | A | absent | A |
| 6 | W6 | horizontal fillet | general weaving | 1 | — | — | — | A | B | B | absent | B |
| 7 | W7 | horizontal fillet | general weaving | 1.2 | — | — | — | A | A | A | absent | A |
| 8 | W8 | horizontal fillet | general weaving | 1.2 | — | — | — | A | A | A | absent | A |
| 9 | W9 | horizontal fillet | general weaving | 1.2 | — | — | — | B | A | A | absent | A |
| 10 | W10 | horizontal fillet | general weaving | 1.2 | — | — | — | A | B | B | absent | B |
| 11 | W11 | horizontal fillet | general weaving | 1.4 | — | — | — | A | A | A | absent | A |
| 12 | W12 | horizontal fillet | general weaving | 1.1 | — | — | — | A | A | A | absent | A |
| 13 | W13 | horizontal fillet | general weaving | 1.5 | — | — | — | B | B | A | absent | A |
| 14 | W14 | horizontal fillet | general weaving | 1 | — | — | — | A | B | B | absent | B |
| 15 | W15 | horizontal fillet | general weaving | 1.2 | — | — | — | A | A | A | absent | A |
| 16 | W16 | horizontal fillet | general weaving | 1.2 | — | — | — | A | B | A | absent | B |
| 17 | W17 | horizontal fillet | general weaving | 1.2 | — | — | — | A | B | B | absent | A |
| 18 | W18 | horizontal fillet | general weaving | 1.2 | — | — | — | A | A | A | absent | A |
| 19 | W19 | horizontal fillet | general weaving | 1.2 | — | — | — | A | A | A | absent | A |
| 20 | W20 | horizontal fillet | general weaving | 1.2 | — | — | — | A | A | A | absent | A |

TABLE 6

| Welding test No. | Welding condition No. | Weaving operation Construction method | kind | Fre- quency (Hz) | Special weaving conditions α [°] | β [°] | α > (β − 180) | Penetration performance | Bead appear- ance | Equal leg length | Weld defect | Weld- ability |
|---|---|---|---|---|---|---|---|---|---|---|---|---|
| 21 | W21 | horizontal fillet | general weaving | 1.2 | — | — | — | B | A | A | absent | A |
| 22 | W22 | horizontal fillet | general weaving | 1.2 | — | — | — | A | B | B | absent | B |
| 23 | W23 | horizontal fillet | general weaving | 1.2 | — | — | — | A | A | A | absent | A |
| 24 | W24 | horizontal fillet | general weaving | 1.2 | — | — | — | A | A | A | absent | A |
| 25 | W25 | horizontal fillet | general weaving | 1.2 | — | — | — | A | A | A | absent | A |
| 26 | W26 | horizontal fillet | general weaving | 1.2 | — | — | — | A | B | B | absent | B |
| 27 | W27 | horizontal fillet | general weaving | 1.2 | — | — | — | B | A | A | absent | A |
| 28 | W28 | horizontal fillet | general weaving | 1.2 | — | — | — | A | A | A | absent | A |
| 29 | W29 | horizontal fillet | general weaving | 1.2 | — | — | — | A | A | A | absent | A |
| 30 | W30 | horizontal fillet | general weaving | 1.2 | — | — | — | A | A | A | absent | A |
| 31 | W31 | horizontal fillet | general weaving | 1.2 | — | — | — | A | B | B | absent | B |
| 32 | W32 | horizontal fillet | general weaving | 1.2 | — | — | — | B | A | A | absent | A |
| 33 | W33 | horizontal fillet | general weaving | 1.2 | — | — | — | A | A | B | absent | A |
| 34 | W34 | horizontal fillet | general weaving | 1.2 | — | — | — | A | A | A | absent | B |
| 35 | W35 | downward fillet | general weaving | 1.2 | — | — | — | A | A | A | absent | A |
| 36 | W36 | downward fillet | general weaving | 1.2 | — | — | — | A | A | A | absent | A |
| 37 | W3 | horizontal fillet | special weaving | 1.2 | 5 | 185 | A | A | A | AA | absent | A |
| 38 | W3 | horizontal fillet | special weaving | 1.2 | 18 | 193 | A | A | A | AA | absent | A |
| 39 | W3 | horizontal fillet | special weaving | 1.2 | 38 | 205 | A | A | A | AA | absent | A |
| 40 | W3 | horizontal fillet | special weaving | 1.2 | 82 | 224 | A | A | A | AA | absent | A |
| 41 | W3 | horizontal fillet | special weaving | 1.2 | 75 | 250 | A | A | A | AA | absent | A |
| 42 | W3 | horizontal fillet | special weaving | 1.2 | 136 | 278 | A | A | A | A | absent | A |
| 43 | W3 | horizontal fillet | special weaving | 1.2 | 3 | 180 | A | A | A | A | absent | A |
| 44 | W37 | horizontal fillet | general weaving | 1.2 | — | — | — | C | B | B | absent | B |
| 45 | W38 | horizontal fillet | general weaving | 1.2 | — | — | — | B | C | B | present | B |
| 46 | W39 | horizontal fillet | general weaving | 1.2 | — | — | — | B | C | C | present | C |
| 47 | W40 | horizontal fillet | general weaving | 1.4 | — | — | — | C | B | C | present | B |

Welding tests No. 1 to No. 43 in Table 5 and Table 6 are the cases where the weaving operation conditions No. W1 to No. W36 in Tables 1 to 4 satisfying the requirements of the present invention were applied, and correspond to Examples. In these Examples, good results were obtained in all of the penetration performance, the bead appearance, the equal leg length, the weld defect, and the weldability.

Among the Examples, in the cases where preferred conditions of the present embodiment are satisfied, better results could be obtained in at least one of the evaluation results.

In contrast, the welding test No. 44 in Table 6 is the case where the weaving operation condition No. W37 in Tables 3 and 4 not satisfying the requirements of the present invention was applied, and corresponds to Comparative Example. In this Comparative Example, since the distance between the tip and the base metal at the reference end point a was not the shortest, a good penetration performance could not be obtained.

The welding test No. 45 in Table 6 is the case where the weaving operation condition No. W38 in Tables 3 and 4 not satisfying the requirements of the present invention was applied, and corresponds to Comparative Example. In this Comparative Example, since the weaving operation pattern F was applied, a good bead appearance could not be obtained, and occurrence of weld defect could not be prevented.

The welding test No. 46 in Table 6 is the case where the weaving operation condition No. W39 in Tables 3 and 4 not satisfying the requirements of the present invention was applied, and corresponds to Comparative Example. In this Comparative Example, since the weaving operation pattern G was applied, a good bead appearance and equal leg length could not be obtained, and occurrence of weld defect could not be prevented. Further, the weldability was inferior.

The welding test No. 47 in Table 6 is the case where the weaving operation condition No. W40 in Tables 3 and 4 not satisfying the requirements of the present invention was applied, and corresponds to Comparative Example. In this Comparative Example, since the weaving operation pattern H was applied, a good penetration performance and equal leg length could not be obtained, and occurrence of weld defect could not be prevented.

As described above, the followings are described in the present description.

[1] A weaving control method for performing welding along a predetermined weld line while swinging a welding torch by a weaving operation in fillet welding of two materials to be welded, wherein:
when the weaving operation is performed,
on a surface perpendicular to a welding direction,
a position of the welding torch is set such that a weaving reference line which is a center line at an initial position of the weaving operation passes through a base point on a weld line, and at least five fixed end points are set,
positions of the fixed end points are set such that one or more of the fixed end points are provided on each of both sides across the weaving reference line and a reference end point a being on the weaving reference line and having the shortest distance between a tip and a base metal is provided; and
the weaving operation is performed such that the welding torch moves between the fixed end points along with a trajectory forming a polygon when viewed from the welding direction.

[2] The weaving control method according to the above [1], wherein the number of the fixed end points provided on each of both sides across the weaving reference is the same.

[3] The weaving control method according to the above [2], wherein:
the total number of the fixed end points is 5; and
when two of the fixed end points provided in the vicinity of the one weaving end are defined as a weaving end point b and a weaving end point c and two of the fixed end points provided in the vicinity of the other weaving end are defined as a weaving end point d and a weaving end point e,
the welding torch repeats an operation of starting from the reference end point a and moving in order of the weaving end point b, the weaving end point c, the weaving end point d, and the weaving end point e.

[4] The weaving control method according to the above [3], wherein the distances between the tip and the base metal at the reference end point a and the weaving end points b to e satisfy the following conditions respectively with respect to a distance between the tip and the base metal set in advance:
reference end point a: 20% to 45%;
weaving end point b: 50% to 80%;
weaving end point c: 100% to 120%;
weaving end point d: 100% to 120%; and
weaving end point e: 80% to 100%.

[5] The weaving control method according to the above [3] or [4], wherein:
a moving speed from the reference end point a to the weaving end point b is 250 cm/min to 450 cm/min;
a moving speed from the weaving end point b to the weaving end point c is 300 cm/min to 500 cm/min;
a moving speed from the weaving end point c to the weaving end point d is 250 cm/min to 450 cm/min;
a moving speed from the weaving end point d to the weaving end point e is 350 cm/min to 550 cm/min;
a moving speed from the weaving end point e to the reference end point a is 150 cm/min to 350 cm/min; and
a stop time of 200 ms or less is provided at each of the fixed end points.

[6] The weaving control method according to any one of the above [3] to [5], wherein at least one of conditions of a welding current, an arc voltage, and a feeding speed is changed at the fixed end points.

[7] The weaving control method according to the above [6], wherein
when the condition of the welding current is changed,
ratios (percentages) of welding current values at the reference end point a and the weaving end points b to e to a set current value satisfy the following conditions respectively:
reference end point a: 105% to 110%;
weaving end point b: 90% to 100%;
weaving end point c: 80% to 90%;
weaving end point d: 80% to 90%; and
weaving end point e: 90% to 100%.

[8] The weaving control method according to the above [6], wherein
when the condition of the arc voltage is changed,
ratios (percentages) of arc voltage values at the reference end point a and the weaving end points b to e to a set voltage value satisfy the following conditions respectively:
reference end point a: 105% to 110%;
weaving end point b: 80% to 90%;
weaving end point c: 110% to 120%;
weaving end point d: 110% to 120%; and
weaving end point e: 80% to 90%.

[9] The weaving control method according to the above [6], wherein
when the condition of the feeding speed is changed,
ratios of feeding speed values at the reference end point a and the weaving end points b to e to a set feeding speed value satisfy the following conditions respectively:
reference end point a: 105% to 110%;
weaving end point b: 90% to 100%;
weaving end point c: 80% to 90%;
weaving end point d: 80% to 90%; and
weaving end point e: 90% to 100%.

[10] The weaving control method according to any one of the above [3] to [9], which is a weaving control method in horizontal fillet welding in which one of the two materials to be welded is an upright plate and the other is a lower plate,
wherein the weaving end point b and the weaving end point c are provided on the upright plate side, and the weaving end point d and the weaving end point e are provided on the lower plate side.

[11] The weaving control method according to the above [3] to [10], wherein interior angles at the weaving end points b to e in a pentagon formed by the reference end point a, the weaving end point b, the weaving end point c, the weaving end point d, and the weaving end point e satisfy the following conditions respectively:
  weaving end point b: 130° to 140°;
  weaving end point c: 60° to 90°;
  weaving end point d: 60° to 90°; and
  weaving end point e: 130° to 140°.

[12] The weaving control method according to the above [10], wherein:
  a trajectory of the welding torch in welding by weaving is a trajectory in which the welding torch is moved forward in the welding direction to the one weaving end, and when the welding torch reaches the one weaving end, the welding torch is moved backward in the welding direction to the other weaving end, and this weaving operation is repeated between the two materials to be welded;
  when the welding torch is moved forward in the welding direction to the one weaving end, a forward movement angle β, which is an angle formed between the trajectory of the welding torch and a direction opposite to the welding direction, is 185° or more and 250° or less;
  when the welding torch is moved backward in the welding direction to the other weaving end, a backward movement angle α, which is an angle formed between the trajectory of the welding torch and a direction opposite to the welding direction, is 5° or more and 85° or less; and
  the backward movement angle α and the forward movement angle β satisfy the following relationship: α>(β−180).

[13] A weaving control system for performing welding along a predetermined weld line while swinging a welding torch by a weaving operation in fillet welding of two materials to be welded, wherein:
  when the weaving operation is performed,
  on a surface perpendicular to a welding direction,
  a position of the welding torch is set such that a weaving reference line which is a center line at an initial position of the weaving operation passes through a base point on a weld line, and at least five fixed end points are set,
  positions of the fixed end points are set such that one or more of the fixed end points are provided on each of both sides across the weaving reference line and a reference end point a being on the weaving reference line and having the shortest distance between a tip and a base metal is provided; and
  the weaving operation is performed such that the welding torch moves between the fixed end points along with a trajectory forming a polygon when viewed from the welding direction.

Although the embodiments are described above with reference to the drawings, it is needless to say that the present invention is not limited thereto. It will be apparent to those skilled in the art that various changes and modifications may be conceived within the scope of the claims. It is also understood that the various changes and modifications belong to the technical scope of the present invention. Each component in the embodiment described above may be combined freely within the range without deviating from the spirit of the invention.

The present application is based on Japanese patent application No. 2018-013930 filed on Jan. 30, 2018, the contents of which are incorporated as reference into the present application.

REFERENCE SIGN LIST

1 Welding system
10 Welding robot
11 Welding torch
20 Robot controller
30 Welding power source
40 Feeding device
50 Upright plate
60 Lower plate
X Welding direction
B Root portion
P Weaving end
P1 Weaving end on upright plate side
P2 Weaving end on lower plate side
L3 Weaving reference line

The invention claimed is:

1. A weaving control method for performing welding along a predetermined weld line while swinging a welding torch by a weaving operation in fillet welding of two materials to be welded, wherein:
  when the weaving operation is performed,
  on a surface perpendicular to a welding direction,
  a position of the welding torch is set such that a weaving reference line which is a center line at an initial position of the weaving operation passes through a base point on a weld line, and at least five fixed end points are set,
  positions of the fixed end points are set such that one or more of the fixed end points are provided on each of both sides across the weaving reference line and a reference end point a being on the weaving reference line and having the shortest distance between a tip and a base metal is provided; and
  the weaving operation is performed such that the welding torch moves between the fixed end points along with a trajectory forming a polygon when viewed from the welding direction,
  wherein the number of the fixed end points provided on each of both sides across the weaving reference line is the same, and
  wherein:
  the total number of the fixed end points is 5; and
  when two of the fixed end points provided in the vicinity of the one weaving end are defined as a weaving end point b and a weaving end point c and two of the fixed end points provided in the vicinity of the other weaving end are defined as a weaving end point d and a weaving end point e,
  the welding torch repeats an operation of starting from the reference end point a and moving in order of the weaving end point b, the weaving end point c, the weaving end point d, and the weaving end point e.

2. The weaving control method according to claim 1, wherein the distances between the tip and the base metal at the reference end point a and the weaving end points b to e satisfy the following conditions respectively with respect to a distance between the tip and the base metal set in advance:
  reference end point a: 20% to 45%;
  weaving end point b: 50% to 80%;
  weaving end point c: 100% to 120%;
  weaving end point d: 100% to 120%; and
  weaving end point e: 80% to 100%.

3. The weaving control method according to claim 2, wherein:
  a moving speed from the reference end point a to the weaving end point b is 250 cm/min to 450 cm/min;
  a moving speed from the weaving end point b to the weaving end point c is 300 cm/min to 500 cm/min;
  a moving speed from the weaving end point c to the weaving end point d is 250 cm/min to 450 cm/min;

a moving speed from the weaving end point d to the weaving end point e is 350 cm/min to 550 cm/min;
a moving speed from the weaving end point e to the reference end point a is 150 cm/min to 350 cm/min; and
a stop time of 200 ms or less is provided at each of the fixed end points.

4. The weaving control method according to claim 2, wherein at least one of conditions of a welding current, an arc voltage, and a feeding speed is changed at the fixed end points.

5. The weaving control method according to claim 2, which is a weaving control method in horizontal fillet welding in which one of the two materials to be welded is an upright plate and the other is a lower plate,
wherein the weaving end point b and the weaving end point c are provided on the upright plate side, and the weaving end point d and the weaving end point e are provided on the lower plate side.

6. The weaving control method according to claim 2, wherein interior angles at the weaving end points b to e in a pentagon formed by the reference end point a, the weaving end point b, the weaving end point c, the weaving end point d, and the weaving end point e satisfy the following conditions respectively:
weaving end point b: 130° to 140°;
weaving end point c: 60° to 90°;
weaving end point d: 60° to 90°; and
weaving end point e: 130° to 140°.

7. The weaving control method according to claim 1, wherein:
a moving speed from the reference end point a to the weaving end point b is 250 cm/min to 450 cm/min;
a moving speed from the weaving end point b to the weaving end point c is 300 cm/min to 500 cm/min;
a moving speed from the weaving end point c to the weaving end point d is 250 cm/min to 450 cm/min;
a moving speed from the weaving end point d to the weaving end point e is 350 cm/min to 550 cm/min;
a moving speed from the weaving end point e to the reference end point a is 150 cm/min to 350 cm/min; and
a stop time of 200 ms or less is provided at each of the fixed end points.

8. The weaving control method according to claim 1, wherein at least one of conditions of a welding current, an arc voltage, and a feeding speed is changed at the fixed end points.

9. The weaving control method according to claim 8, wherein
when the condition of the welding current is changed,
ratios (percentages) of welding current values at the reference end point a and the weaving end points b to e to a set current value satisfy the following conditions respectively:
reference end point a: 105% to 110%;
weaving end point b: 90% to 100%;
weaving end point c: 80% to 90%;
weaving end point d: 80% to 90%; and
weaving end point e: 90% to 100%.

10. The weaving control method according to claim 8, wherein
when the condition of the arc voltage is changed,
ratios (percentages) of arc voltage values at the reference end point a and the weaving end points b to e to a set voltage value satisfy the following conditions respectively:
reference end point a: 105% to 110%;
weaving end point b: 80% to 90%;
weaving end point c: 110% to 120%;
weaving end point d: 110% to 120%; and
weaving end point e: 80% to 90%.

11. The weaving control method according to claim 8, wherein
when the condition of the feeding speed is changed,
ratios of feeding speed values at the reference end point a and the weaving end points b to e to a set feeding speed value satisfy the following conditions respectively:
reference end point a: 105% to 110%;
weaving end point b: 90% to 100%;
weaving end point c: 80% to 90%;
weaving end point d: 80% to 90%; and
weaving end point e: 90% to 100%.

12. The weaving control method according to claim 1, which is a weaving control method in horizontal fillet welding in which one of the two materials to be welded is an upright plate and the other is a lower plate,
wherein the weaving end point b and the weaving end point c are provided on the upright plate side, and the weaving end point d and the weaving end point e are provided on the lower plate side.

13. The weaving control method according to claim 12, wherein:
a trajectory of the welding torch in welding by weaving is a trajectory in which the welding torch is moved forward in the welding direction to the one weaving end, and when the welding torch reaches the one weaving end, the welding torch is moved backward in the welding direction to the other weaving end, and this weaving operation is repeated between the two materials to be welded;
when the welding torch is moved forward in the welding direction to the one weaving end, a forward movement angle β, which is an angle formed between the trajectory of the welding torch and a direction opposite to the welding direction, is 185° or more and 250° or less;
when the welding torch is moved backward in the welding direction to the other weaving end, a backward movement angle α, which is an angle formed between the trajectory of the welding torch and a direction opposite to the welding direction, is 5° or more and 85° or less; and
the backward movement angle α and the forward movement angle β satisfy the following relationship: α>(β−180).

14. The weaving control method according to claim 1, wherein interior angles at the weaving end points b to e in a pentagon formed by the reference end point a, the weaving end point b, the weaving end point c, the weaving end point d, and the weaving end point e satisfy the following conditions respectively:
weaving end point b: 130° to 140°;
weaving end point c: 60° to 90°;
weaving end point d: 60° to 90°; and
weaving end point e: 130° to 140°.

15. A weaving control system for performing welding along a predetermined weld line while swinging a welding torch by a weaving operation in fillet welding of two materials to be welded, wherein:
when the weaving operation is performed,
on a surface perpendicular to a welding direction,
a position of the welding torch is set such that a weaving reference line which is a center line at an initial position of the weaving operation passes through a base point on a weld line, and at least five fixed end points are set, positions of the fixed end points are set such that one or more of the fixed end points are provided on each of both sides across the weaving reference line and a reference end point a being on the weaving reference line and having the shortest distance between a tip and a base metal is provided; and the weaving operation is performed such that the welding torch moves between the fixed end points along with a trajectory forming a polygon when viewed from the welding direction, wherein the number of the fixed end points provided on each of both sides across the weaving reference line is the same, and wherein:

the total number of the fixed end points is 5; and when two of the fixed end points provided in the vicinity of the one weaving end are defined as a weaving end point b and a weaving end point c and two of the fixed end points provided in the vicinity of the other weaving end are defined as a weaving end point d and a weaving end point e, the welding torch repeats an operation of starting from the reference end point a and moving in order of the weaving end point b, the weaving end point c, the weaving end point d, and the weaving end point e.

* * * * *